(12) United States Patent
Nguyen et al.

(10) Patent No.: US 10,936,024 B2
(45) Date of Patent: Mar. 2, 2021

(54) STORAGE DRIVE CARRIER FOR HIGH-DENSITY STORAGE SOLUTION

(71) Applicant: Cisco Technology, Inc., San Jose, CA (US)

(72) Inventors: Phuoc-An N Nguyen, Milpitas, CA (US); Daniel Bernard Hruska, San Carlos, CA (US); Anant Thakar, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/895,125

(22) Filed: Feb. 13, 2018

(65) Prior Publication Data

US 2019/0250679 A1    Aug. 15, 2019

(51) Int. Cl.
*G06F 1/18* (2006.01)
*G11B 33/12* (2006.01)

(52) U.S. Cl.
CPC ............ *G06F 1/183* (2013.01); *G11B 33/126* (2013.01); *G11B 33/127* (2013.01)

(58) Field of Classification Search
CPC ....... H01L 24/90; G06F 1/183; G11B 33/127; G11B 33/126
See application file for complete search history.

(56) References Cited

U.S. PATENT DOCUMENTS

| | | | | |
|---|---|---|---|---|
| 5,406,450 A | * | 4/1995 | Shieh | G06F 1/184 361/679.37 |
| 5,519,571 A | * | 5/1996 | Shieh | G06F 1/184 361/679.37 |
| 5,576,938 A | * | 11/1996 | Beun | H02B 1/04 174/50 |
| 5,611,057 A | * | 3/1997 | Pecone | G06F 1/184 361/784 |
| 5,873,745 A | * | 2/1999 | Duclos | H01R 13/62944 439/157 |
| 6,257,902 B1 | * | 7/2001 | Shieh | H01R 27/02 361/679.32 |
| 6,264,506 B1 | * | 7/2001 | Yasufuku | G06K 7/0021 439/638 |

(Continued)

OTHER PUBLICATIONS

"Cisco UCS S3260 Storage Server", Cisco, Document ID: 1476916267795812, Updated: May 22, 2017, 4 pgs.

(Continued)

*Primary Examiner* — Jinhee J Lee
*Assistant Examiner* — Theron S Milliser
(74) *Attorney, Agent, or Firm* — Edell, Shapiro & Finnan, LLC

(57) ABSTRACT

A high density storage housing includes a housing and a plurality of drive carriers. The housing includes a storage area and a motherboard. The storage area extends across at least a portion of a width and at least a portion of a depth of the housing. The motherboard extends across the storage area and includes a plurality of first connectors. The plurality of drive carriers each include a second connector configured to mate directly with one of the plurality of first connectors. Moreover, the second connector of each drive carrier of the plurality of drive carriers is disposed on a long side of its drive carrier so that the plurality of drive carriers mount storage drives to the housing in a sideways orientation.

23 Claims, 12 Drawing Sheets

(56) References Cited

U.S. PATENT DOCUMENTS

| | | | |
|---|---|---|---|
| 6,392,884 B1 | 5/2002 | Chou | |
| 6,408,352 B1* | 6/2002 | Hosaka | G06K 19/077 710/301 |
| 6,599,147 B1* | 7/2003 | Mills | G01C 21/20 439/377 |
| 6,621,693 B1 | 9/2003 | Potter et al. | |
| 6,736,678 B2* | 5/2004 | Yao | H01R 33/90 361/679.32 |
| 6,768,638 B2 | 7/2004 | Shih | |
| 6,816,368 B2 | 11/2004 | Yokosawa | |
| 7,108,553 B2* | 9/2006 | Zhu | H01R 13/648 439/607.01 |
| 7,125,258 B2* | 10/2006 | Nakakubo | G06K 19/07741 439/64 |
| 7,177,145 B2 | 2/2007 | Carlson et al. | |
| 7,326,077 B2* | 2/2008 | Shih | G06F 1/186 439/372 |
| 7,453,707 B2 | 11/2008 | Beall et al. | |
| 7,710,731 B2 | 5/2010 | McClure et al. | |
| 8,363,394 B2* | 1/2013 | Chen | G06F 1/187 361/679.33 |
| 8,432,684 B2* | 4/2013 | Wu | G06F 1/185 361/679.41 |
| 8,441,786 B2* | 5/2013 | Williams | G06F 1/187 361/679.33 |
| 9,141,152 B2* | 9/2015 | Gay | G06F 1/187 |
| 10,070,549 B2* | 9/2018 | Su | H05K 7/1409 |
| 2002/0081890 A1* | 6/2002 | Obermaier | H05K 7/1451 439/377 |
| 2002/0144044 A1 | 10/2002 | Moon et al. | |
| 2003/0011976 A1 | 1/2003 | Treiber et al. | |
| 2005/0219826 A1 | 10/2005 | Carlson et al. | |
| 2005/0257232 A1 | 11/2005 | Hidaka | |
| 2006/0050487 A1 | 3/2006 | Wu et al. | |
| 2006/0067063 A1* | 3/2006 | Stahl | H05K 7/1409 361/754 |
| 2007/0247805 A1 | 10/2007 | Fujie et al. | |
| 2008/0239650 A1* | 10/2008 | Fujie | G06F 1/187 361/679.35 |
| 2008/0239651 A1* | 10/2008 | Curnalia | G11B 33/122 361/679.34 |
| 2008/0285221 A1 | 11/2008 | Imsand et al. | |
| 2009/0091884 A1* | 4/2009 | Walker | G06F 1/187 361/679.37 |
| 2009/0146030 A1* | 6/2009 | Chen | G06F 1/187 248/213.2 |
| 2009/0164685 A1* | 6/2009 | Chen | G06F 3/0607 710/301 |
| 2010/0254096 A1* | 10/2010 | Kim | G06F 1/185 361/737 |
| 2011/0235262 A1 | 9/2011 | Cheng | |
| 2012/0127648 A1 | 5/2012 | Randall et al. | |
| 2014/0268536 A1 | 9/2014 | Herman et al. | |
| 2015/0181748 A1 | 6/2015 | Bailey et al. | |
| 2017/0045921 A1* | 2/2017 | Norton | H05K 7/1487 |

OTHER PUBLICATIONS

"SuperStorage Server 2028R-E1CR48N (Complete System Only)", Supermicro, https://www.supermicro.com/products/system/2U/2028/SSG-2028R-E1CR48N.cfm, Downloaded from the Internet on Jan. 26, 2018, 2 pgs.

* cited by examiner

STORAGE DRIVE CARRIER FOR HIGH-DENSITY STORAGE SOLUTION

TECHNICAL FIELD

The present disclosure relates to a storage drive carrier that is positionable within a storage housing, such as a storage blade, and a storage housing for the same.

BACKGROUND

Advances in storage drive technology have created a number of different storage drive form factors, such as various small form factor (SFF) configurations. However, to provide compatibility over a wide variety of systems, storage drives of any size typically includes a connector in a similar location (e.g., a back, bottom edge). This location limits the manner and orientation in which the SFF storage can be installed in a storage solution, such as a storage blade, which in turn, limits the density of storage drives in a storage solution. Since more connected entities are creating an ever-increasing amount of data, it is important to maximize the amount of storage provided by storage solutions, such as storage blades.

BRIEF DESCRIPTION OF THE DRAWINGS

Like reference numerals have been used to identify like elements throughout this disclosure.

DESCRIPTION OF EXAMPLE EMBODIMENTS

Overview

Figure 1:
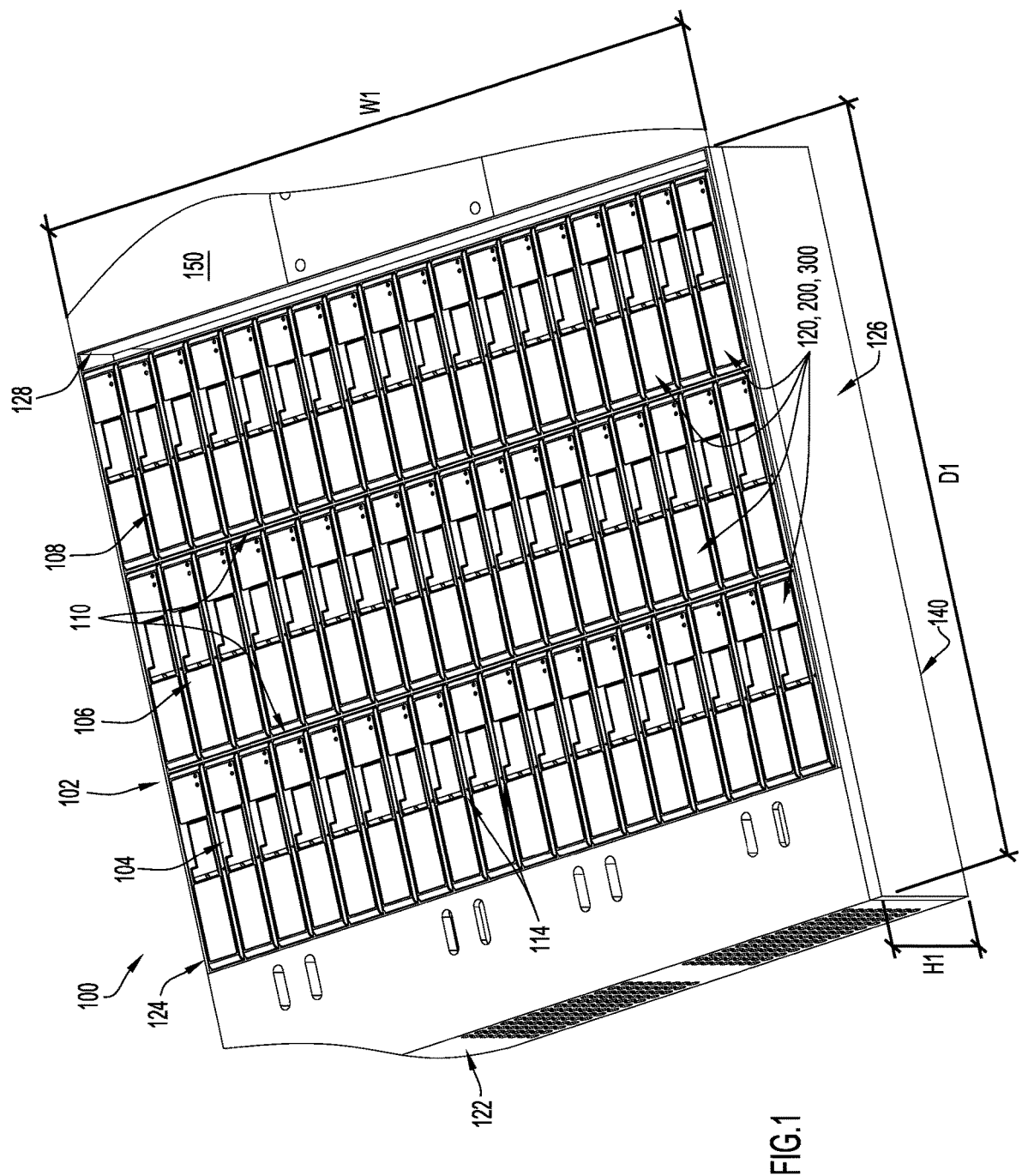
FIG. 1 illustrates a top perspective view of an example embodiment of a high density storage solution with its top cover in an open position to expose a storage area, according to an example embodiment.

A high density storage solution and storage drive carrier for the same are provided herein. In one embodiment, a system includes a housing and a plurality of drive carriers. The housing includes a storage area and a motherboard. The storage area extends across at least a portion of a width and at least a portion of a depth of the housing. The motherboard extends across the storage area and includes a plurality of first connectors. The plurality of drive carriers each include a second connector configured to mate directly with one of the plurality of first connectors. Moreover, the second connector of each drive carrier of the plurality of drive carriers is disposed on a long side of its drive carrier so that the plurality of drive carriers mount storage drives to the housing in a sideways orientation.

Example Embodiments

The storage drive carrier presented herein maximizes density in a storage housing because a major or long side of the drive carrier directly engages a bottom of a storage area included in the storage housing. More specifically, the storage drive carrier (for simplicity, the storage drive carrier presented herein is also referred to herein simply as a carrier) couples a storage drive (which typically includes a connector along a shorter or minor side, such as its short, back side) directly to a motherboard included along a bottom surface of a storage housing (which may also be referred to herein as a storage solution) along a long or major side of the storage drive. That is, the carrier is configured to mate with a motherboard that sits on or above and is parallel to (or integral with) a bottom cover of the storage housing or storage solution. As is explained in further detail below, connecting a top-down installed carrier to a motherboard along its major side (which is the bottom side of the carrier and the storage drive when the carrier is installed in a sideways orientation) simplifies installation and removal operations while also improving cooling for a storage drive disposed within the carrier (by way of improving airflow).

Put another way, the storage carrier presented herein positions a storage drive in a sideways orientation, insofar as "sideways orientation" indicates that the storage drive is rotated 90 degrees about a longitudinal axis that extends orthogonally through the front and back of the storage drive, from a position in which its connector is disposed at a back, bottom edge of the storage drive to a position in which its connector is disposed at a back, side (i.e., right or left) edge of the storage drive. As mentioned, in order to install a carrier into a storage housing in a sideways orientation, the carrier is installed in a top-down manner. For example, if the storage housing is a storage blade, the storage blade is pulled out of its rack, a top cover is removed (i.e., lifted or slid open), and the carrier is lowered downwards into the storage blade (from a position above the pulled-out storage blade). In at least one implementation, the storage carrier allows a 2.5 inch small form factor (SFF) storage drive to be installed in a storage blade that fits into a two rack unit (2U) form-factor slot of a blade chassis.

To facilitate this type of installation, the carrier presented herein includes a lock assembly and an interposer printed circuit board assembly (PCBA) (referred to herein as interposer board, for simplicity). The interposer board connects the storage drive's connector to the motherboard. The lock assembly is disposed along a top major/long side (i.e., the long side opposite the long side facilitating a connection with a motherboard). Each of these features are described in detail below; however, generally, the lock assembly allows a user to easily grasp a carrier while it is in a sideways orientation, such as during installation of the carrier into a high density storage solution or during removal of the carrier from the high density storage solution. The lock assembly also includes a push-push latch assembly that allows the carrier to be easily locked into or unlocked from a drive slot in a high density storage solution with a single actuation.

In order to describe the storage drive carrier and storage solution presented herein, terms such as "left," "right," "top," "bottom," "front," "rear," "side," "height," "length," "width," "upper," "lower," "interior," "exterior," "inner," "outer," "depth," and the like as may be used. However, it is to be understood that these terms merely describe points of reference and do not limit the present invention to any particular orientation or configuration. For example, the terms "height," "width," and "depth" may be used to describe certain embodiments presented herein, but it is to be understood that these terms are not intended to limit the storage drive carrier and storage solution presented herein to a specific implementations. Instead, in at least some embodiments, the storage solution presented herein (e.g., the storage blade) may be oriented vertically (i.e., the housing may be rotated 90 degrees about an axis extending through a front and back of the housing), horizontally (as shown), or in any other manner during use (e.g., when installed into a blade chassis/enclosure). For example, storage drive carriers might be installed into a storage solution by moving the storage drive carriers horizontally into and out of the storage solution (as opposed to moving the storage drive carriers vertically). Consequently, even if a certain dimension is described herein as a "height," it may be understood that this dimension may provide a width or depth when the storage blade is moved to different orientations.

Moreover, although the storage drive carrier is largely described herein in connection with a 2U storage solution and a 2.5 inch SFF storage drive, it is to be understood that these sizes describe one example embodiment and the concepts described herein may be utilized for storage solutions of different sizes (e.g., to provide a high density storage blade for smaller or larger storage drives in smaller or larger drive slots, respectively). Similarly, the drive slots included in the storage solution presented herein may each be configured to support any type of media drive, such as a hard disk drive (HDD), a solid state drive (SSD), or a hybrid drive. Consequently, in some embodiments, the storage solution presented herein may offer storage to a wide variety of computing architectures. For example, when the storage blade is configured as a storage blade, the storage blade may offer direct attached storage to any servers installed in a blade enclosure with the storage blade. In at least some embodiments, the storage solution may also include hot-serviceable media and other design parameters, such as power limitations and memory parameters, to provide enterprise class reliability.

Reference is first made to FIG. 1, which illustrates an example embodiment of a high density storage solution 100. In FIG. 1, the storage solution 100 is a storage blade; however, it is to be understood that the storage drive carrier presented herein may be installed in a wide variety of storage solutions and the storage blade shown in the Figures is simply one example of a storage solution. For example, in some embodiments, the storage solution may be a rack server, a storage drawer, or a stand-alone storage enclosure. Consequently, any description of a storage blade included herein is to be understood to apply to a wide variety of storage solutions. Nevertheless, when the storage housing/storage solution is configured as a storage blade, the storage blade may be compatible with a wide variety of blade chasses, such as the Cisco Systems, Inc. Unified Computing System (UCS) blade chassis.

Although the storage housing 100 is merely one example of a storage housing suitable to receive the storage drives carrier presented herein, generally, the storage solution 100 (which may also be referred to as storage blade 100 with the understanding that any description of storage blade 100 also applies to other storage solutions) includes a front 122, a first (i.e., left) side 124, a second (i.e., right) side 126, a back 128, and a bottom 140. The front 122 extends from the first side 124 to the second side 126 and substantially defines the external width W1 of the storage blade 100 (insofar as the term "substantially" is meant to imply that the width W1 may be determined based on the width of the front 122 or the width of the front 122 plus the thicknesses of side 126 and side 128). Meanwhile, sides 126, 128 may substantially define the external height H1 and external depth D1 of the storage blade 100. The storage blade 100 may also include a removable top cover 150 that may be pivotally, slidably, or otherwise movably attached to the back 128 of the storage blade 100.

In the depicted embodiment, the storage blade 100 is configured to fit in a full width 2U slot of a chassis/enclosure. That is, the storage blade 100 includes external dimensions configured to fit into a 2U slot of a blade enclosure/chassis and, thus, the external height H1 of the storage blade 100 may be approximately 3.5 inches (to satisfy the 2U requirement). Meanwhile, D1 and W1 may be sized to span the full depth and width, respectively, of the particular chassis in which the storage blade is mounted. For example, D1 may be approximately 13.9 inches, approximately 19.2 inches, or some other depth and W1 may be approximately 19 inches, approximately 23 inches, or some other width. However, in other embodiments, the storage blade 100 may have a height H1, depth D1, and width W1 configured to span a 2U slot of any dimensions. For example, storage blade 100 may have a depth D1 and width W1 configured to span a half-width 2U slot. Still further, in some embodiments, storage blade 100 may be configured to receive storage drives of different sizes and, thus may have a height H1, depth D1, and width W1 configured to span a 1U, 3U, or some other sized slot, as needed for the particular drive size.

Regardless of the external dimensions of the storage blade 100, the front 122, the first side 124, the second side 126, the back 128, and the bottom 140 collectively define a storage area 102 and the removable cover 150 provides top-down access to this storage area 102. That is, any components included in the storage area 102 may be accessed from a position above the storage blade 100 (however, as mentioned above, orientation terms are merely meant to be examples, so in some instances, cover 150 may provide horizontal access if the storage blade is oriented vertically). Meanwhile, the back 128 may include a backplane or any similar components to connect the storage area 102 and/or the components stored in the storage area 102 to other computing components (e.g., blades installed in the chassis/enclosure in which the storage blade 100 is installed).

Still referring to FIG. 1, the storage area 102 is configured to receive and support storage drive carriers 300 (with storage drives 200 mounted therein) in a sideways orientation. More specifically, the storage area 102 includes stanchions that extend orthogonally upwards from the bottom 140 to define drive slots 120 that are sized to receive and mate with drive carriers 300. In the particular embodiment depicted in FIG. 1, lateral stanchions 110 (including internal lateral stanchions 110(1) and external lateral stanchions/ walls 110(2), each of which are described in further detail below in connection with FIG. 3) extend orthogonally between the first side 124 and the second side 126 to define three lateral banks extending across a width of the storage area 102 (i.e., in a direction of width W1): front bank 104, middle bank 106, and rear bank 108. Meanwhile, longitudinal stanchions 114 extend across a depth of the storage area 102 (i.e., in a direction of depth D1) and divide each of bank 104, 106, and 108 into individual drive slots 120 configured to receive a carrier 300 (and storage drive 200).

Figure 2:
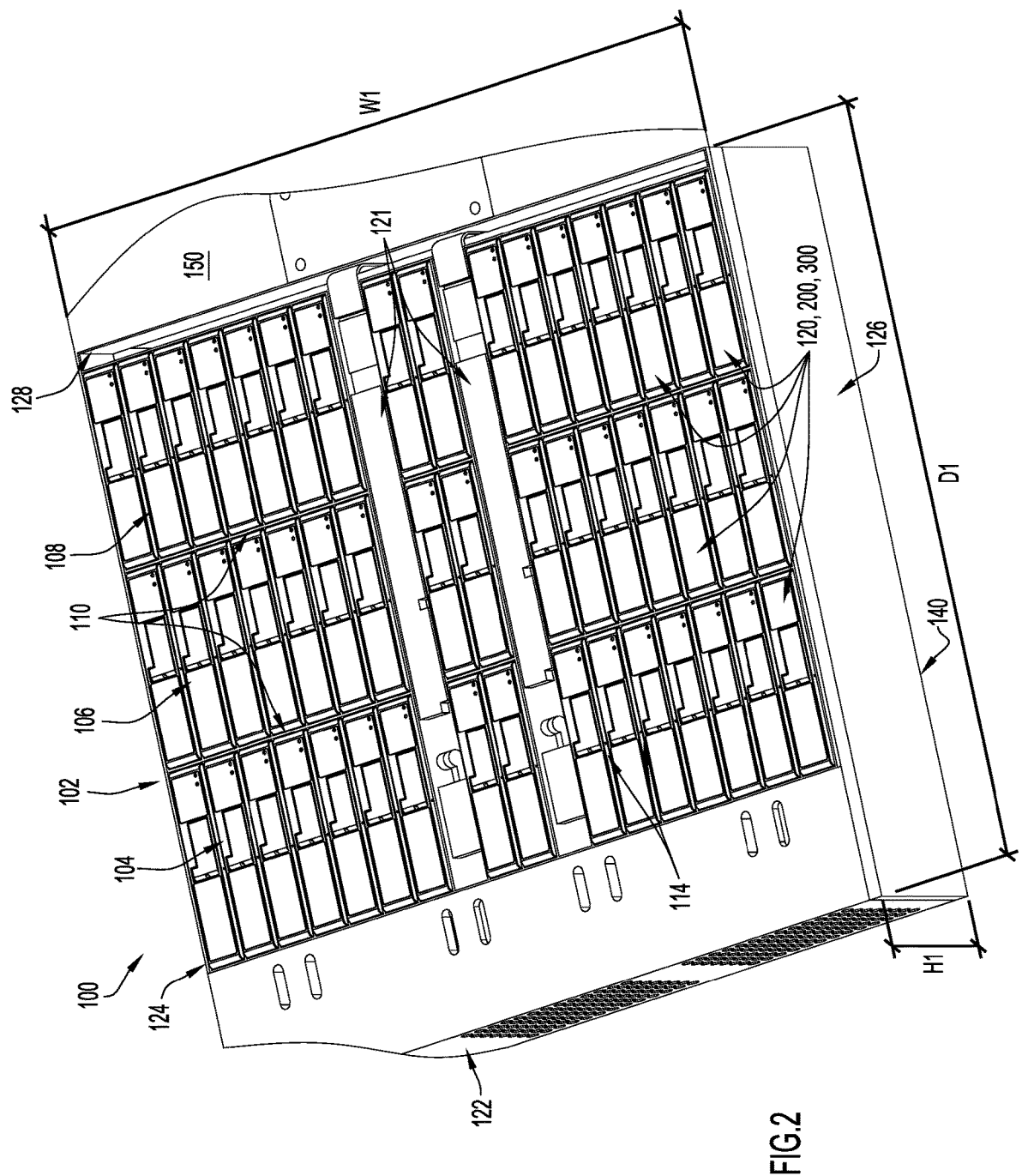
FIG. 2 illustrates a top perspective view of the high density storage solution of FIG. 1 with the storage area partially reconfigured to receive switch cards with drive carriers.

Now turning to FIG. 2, but with continued reference to FIG. 1, in different embodiments, the storage area 102 may be reconfigured or adjusted to receive different components. For example, in FIG. 1, the storage area 102 defines a plurality of drive slots 120 configured to receive SFF storage drives 200; however, in FIG. 2, the storage area 102 also includes drive slots 120 and elongated slots 121 configured to receive switch cards. That is, in FIG. 1, the storage area is uniformly patterned and each of bank 104, bank 106, and bank 108 includes 18 drive slots 120 so that the storage area 102 defines 54 drive slots 120 for SFF storage drives 200 (for 2.5 inch SFF storage drives in the depicted embodiment). Meanwhile, in FIG. 2, each of bank 104, bank 106, and bank 108 defines 16 drive slots 120 (for a total of 48 drive slots 120), but the lateral stanchions 110 include breaks or openings that allow bank 104, bank 106, and bank 108 to collectively define two switch slots 121 that extend across the depth of the storage area 102. Consequently, in FIG. 2, the storage area 102 defines 48 drive slots 120 for SFF storage drives 200 and two drive slots 121 for high-speed switches or other similarly sized components.

In some embodiments, the storage area 102 may be reconfigured by adjusting or reconfiguring stanchions 110 and/or stanchions 114. That is, in some embodiments, stanchions 110 and/or stanchions 114 may be adjustable or reconfigurable. For example, the lateral stanchions 110 may be formed from a series of components and portions of the lateral stanchions 110 may be removed from the storage area 102 by removing one or more of the components. Alternatively, stanchions 110 may be movably or removably coupled (via any movable or removable coupling now known or developed hereafter) to the side 124 and side 126 and/or stanchions 114 may be movably or removably coupled to the front 122 and back 128. Thus, that stanchions 110 and/or stanchions 114 may be moved within the storage area 102 to reconfigure the storage area 102 removed from the storage area 102 and replaced with any desirable configuration of stanchions 110 and/or stanchions 114 to reconfigure the storage area 102.

That is, the two configurations of storage area 102 shown in FIGS. 1 and 2 are merely example configurations and, in other embodiments, the storage area 102 may receive any combination of components while still providing high density storage created by installing the storage drives in a sideways orientation in the manner described herein. As an example, the storage area 102 could be configured so that banks 104 and 106 are arranged as shown in FIG. 1 (i.e., so that banks 104 and 106 provide 18 drive slots 120) and the third bank 108 is devoid of longitudinal stanchions 114. This would allow the third bank 108 to receive a component spanning the width (i.e., in a direction of width W1) of storage area 102. Additionally or alternatively, the third bank 108 could include some longitudinal stanchions 114 and additional lateral stanchions 110 to define at least some drive slots that are 90 degrees offset from the drive slots 120 included in banks 104 and 106 (for example, if the component spanning the width of the storage area 102 only spans a portion of the depth (i.e., in a direction of D1) of bank 108). A motherboard 142 included at a bottom of the storage area 102 (which is described in further detail in connection with FIG. 3) may be modified or customized to accommodate a non-uniform configurations.

Figure 3:
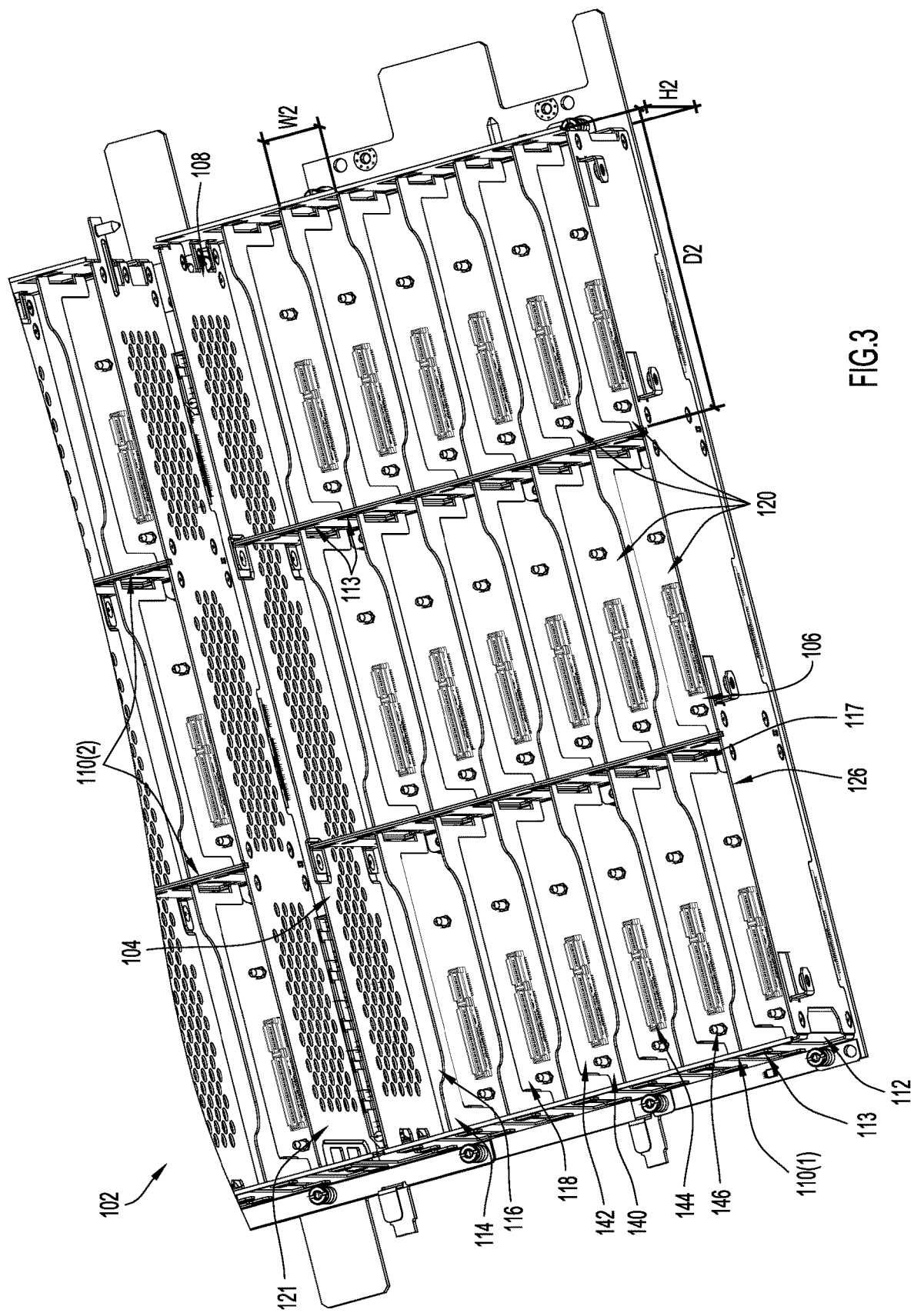
FIG. 3 illustrates a top perspective view of a portion of the storage area configuration shown in FIG. 2, but with the drive carriers and the switch cards removed from their respective slots.

In FIG. 3, a portion of the storage area 102 as configured in FIG. 2 is shown with the drive carriers 300 (and storage drives 200) removed from their drive slots 120. Consequently, stanchions 110 and stanchions 114, as well as a bottom 140 of the storage area 102, can be clearly seen. Notably, stanchions 110 and 114 each include airflow enhancement features that improve cooling for any storage drives 200 installed in slots 120. In particular, lateral stanchions 110 include openings 112 that are substantially aligned with the longitudinal stanchions 114. That is, the longitudinal stanchions 114 may bisect the openings 112 and connect to the lateral stanchions 110 at location(s) above and/or below the opening 112. The openings 112 allow air to flow between the drive slots 120 in a front-to-back direction (i.e., from the front 122 towards the back 128, or vice versa). By comparison, if the storage drives were connected to the motherboard 142 via mini backplanes included on or acting as stanchions 110, the mini backplanes would prevent or at least limit airflow in the front-to-back direction.

The longitudinal stanchions 114, on the other hand, include a lower opening 118 and top tapers 116 that allow air to flow between the drive slots 120 in a side-to-side manner (i.e., from the first side 124 towards the second side 126, or vice versa). The longitudinal stanchions 114 may also include a vertical slot 117 that spans the opening 112 of the lateral stanchion 110. Consequently, the portion of a longitudinal stanchions 114 extending between two adjacent drive slots 120 may resemble an M with flared corners and a flattened central downward extension (or a styled inverted U). If the storage drives were connected to the motherboard 142 via mini backplanes included on or acting as stanchions 114, the mini backplanes would prevent or at least limit airflow in the side-to-side direction.

Figure 4:
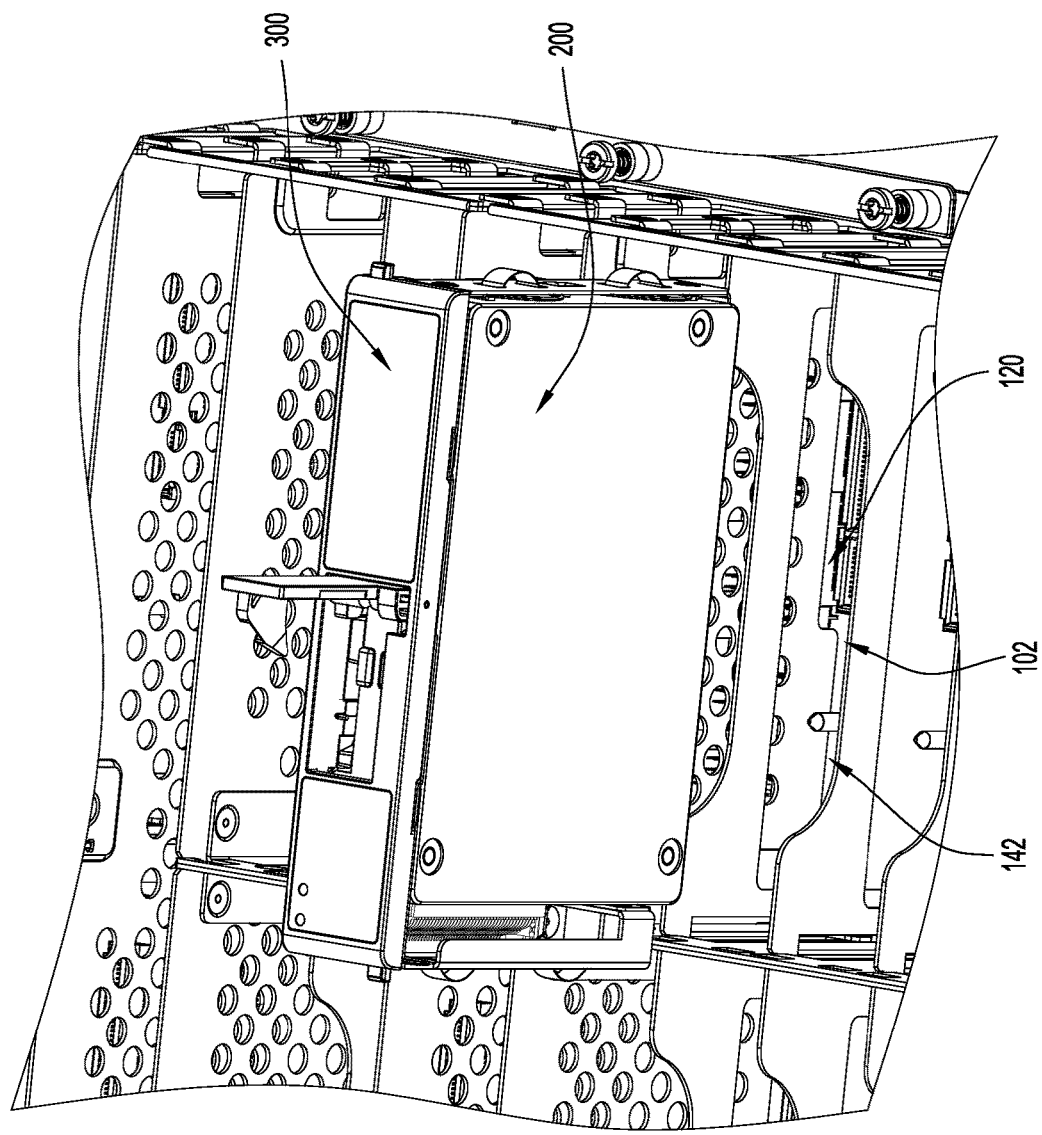
FIG. 4 illustrates a right side perspective view of an example embodiment of a carrier for a small form factor (SFF) storage drive that is suitable for the high density storage solution presented herein while being installed into one of the drive slots shown in FIG. 3.

Still referring to FIG. 3, but now with reference to FIG. 4 as well, the storage area 102 also includes a motherboard 142 that extends beneath or across a bottom of the storage area 102. In some embodiments, the motherboard 142 is formed separately from a bottom plate that defines the bottom 140 of the storage housing and is attached thereto subsequent to its formation. In other embodiments, the motherboard 142 is formed integrally with a bottom plate defining the bottom 140 of the storage drive 100. Regardless, the motherboard 142 is disposed atop and parallel to the bottom 140 of the storage drive 100 and provides connectors at the bottom of each drive slot 120. In particular, the motherboard 142 aligns an edge card connector 144 (which is disposed between two pin connectors 146) with each drive slot 120 provided in the storage area 102. Consequently, each carrier 300 may be installed into the storage housing 100 with a single, linearly downward motion, as is illustrated in FIG. 4 and as explained in further detail below (as opposed to a two-step installation motion that would require a user to insert a carrier downwards into a slot and then move the carrier laterally into engagement with a backplane or mini backplane included on or acting as stanchion 110 or stanchion 114). Although not shown, the motherboard 142 may also provide any connectors at a bottom of switch slots 121 or other such slots to provide a connection to non-storage drive components.

In order to ensure that a carrier 300 remains stably coupled to a connector 144 and pin connectors 166 disposed in a particular drive slot 120, the lateral stanchions 110 also include apertures 113 that are engageable by locking features included on a carrier 300, which are described in further detail below. Since exterior lateral stanchions 110(1) only border one drive slot, the exterior lateral stanchions 110(1) include one aperture 113 per drive slot 120. By comparison, interior lateral stanchions 110(2) border two drive slots 120 (one on either side of the interior lateral stanchions 110(2)) and, thus, include two apertures 113 per drive slot. Consequently, drive carriers 300 installed on either side of the interior lateral stanchions 110(2) can engage an aperture 113 with locking features included therein. This engagement allows the carriers 300 to be locked into place while connected to the motherboard 142 after being inserted into a drive slot 120 with a single, downward linear motion (e.g., in a top-down manner).

Before turning to FIG. 5, an example storage drive 200 is discussed in connection with FIGS. 6 and 7. This discussion provides a general description of dimensions and facets/faces/sides of a storage drive 200 that is helpful in understanding the orientation of the carrier 300 and storage drive 200 when stored within the storage housing 100 presented herein. Often, SFF drives are manufactured in accordance with Electronic Industries Association (EIA) SFF specifications and described with reference to particular dimensions. For example, in EIA specifications, SFF drives (e.g., 2.5" SFF drives) are described as having a width, length, and height. However, when used with the carrier 300 provided herein, the storage drives are rotated 90 degrees about an axis extending through a front to back of the storage drive, so that the storage drives 200 are in an upright or sideways orientation (for clarity, the front and back faces from EIA specifications are referred to herein as the front and back faces, both prior to and subsequent to the rotation). Consequently the dimensions of the storage drive 200 and carrier 300 are labeled and described with respect to its upright or sideways orientation, but now briefly explained with respect to generally known EIA specifications.

Figure 6:
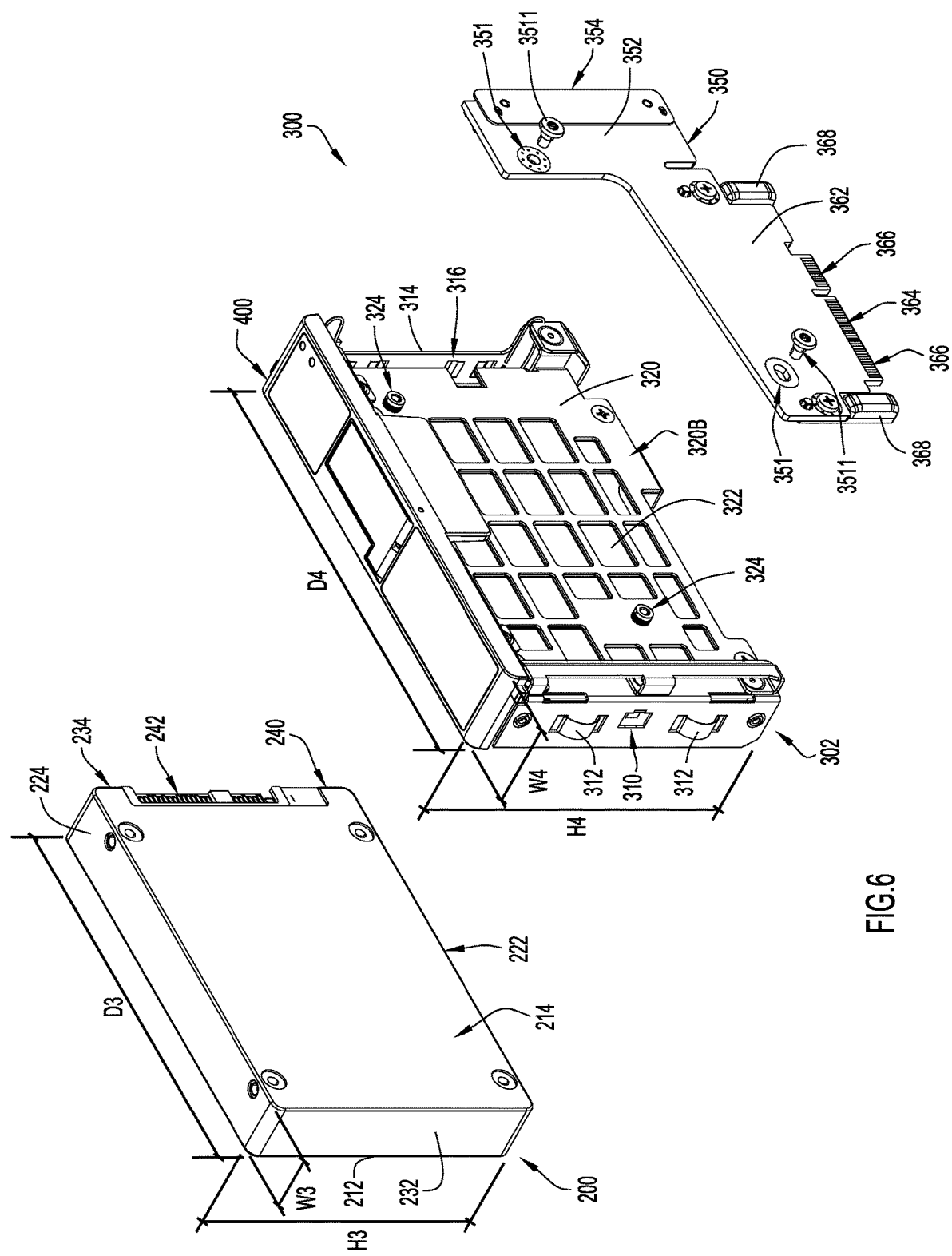
FIG. 6 illustrates an exploded, left side perspective view of the carrier and the SFF storage drive of FIG. 4.

More specifically, in FIG. 6, the storage drive 200 is shown having a height H3 that may be typically referred to as a width in EIA specifications, a width W3 that may be typically referred to as a height in EIA specifications, and a depth D3 that may be typically referred to as a length in EIA specifications. Consequently, when the storage drive 200 is a 2.5 SFF storage drive, the height H3 may be approximately 2.75 inches, the width W3 may be approximately 0.75 inches, and depth D3 may be approximately 3.955 inches. In view of this assignment of dimensions, the shorter or minor sides of the storage drive 200 (defined by W3×H3) may be referred to as front 232 and back 234 (and are typically seen as the front and back of a storage drive in EIA literature). Meanwhile, the longer or major sides of the storage drive 200 (defined by W3×D3) may be referred to as bottom 222 and top 224, despite typically being depicted as the left and right sides of a SFF drive in EIA literature and despite being the left and right sides in many typical storage implementations. Finally, the opposing faces of the storage drive (defined by H3×D3) may be referred to as the left face or side 212 and the right face or side 214, despite typically being depicted as the top and bottom of a SFF drive in EIA literature and despite being the top and bottom of a storage drive in many typical storage implementations.

As a consequence of the aforementioned part names assigned to the faces and sides of the storage drive 200, a standard connector 242 that is typically included along a back, bottom edge of a storage drive is provided on a right, back edge 242 of the storage drive 200 when the storage drive is in an upright or sideways orientation. Notably, the connector 242 is not in a different position as compared to EIA specifications; the connector 242 is simply referred to herein as being in a different position, since it clearly describes how the storage drive 200 is stored in the carrier 300 (and storage blade 100) presented herein.

Figure 5:
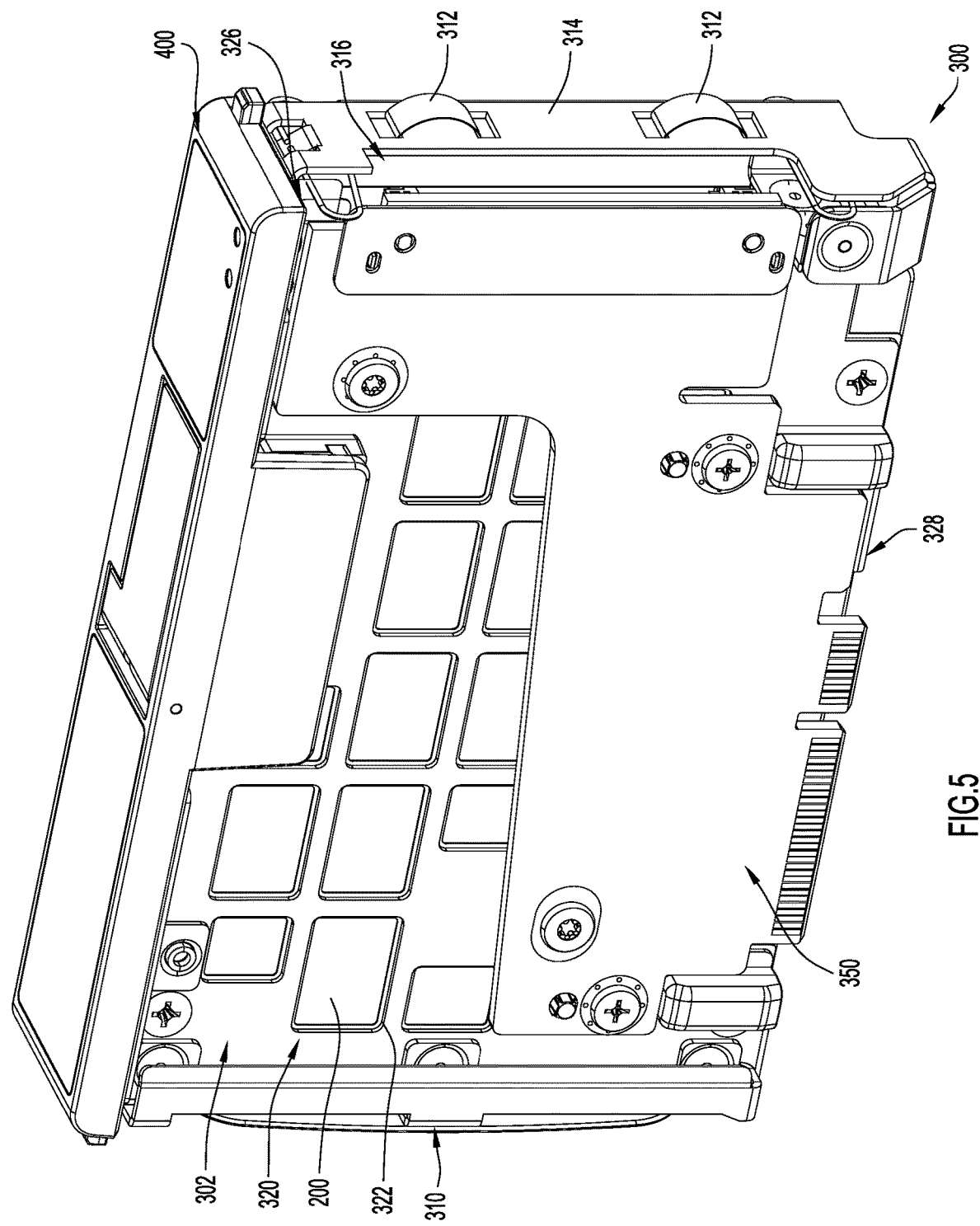
FIG. 5 illustrates a left side perspective view of the carrier of FIG. 4.
Figure 7:
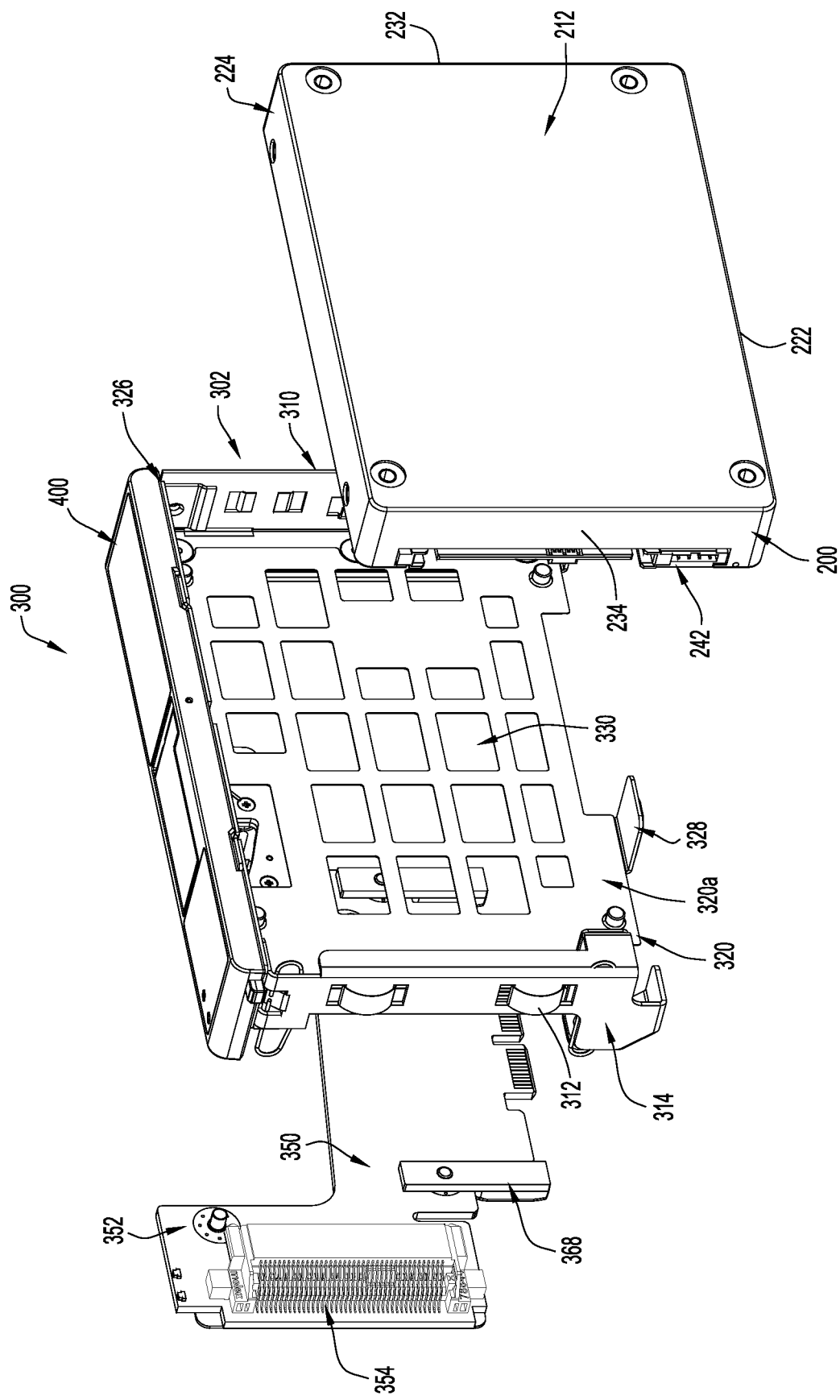
FIG. 7 illustrates an exploded, right side perspective view of the carrier and the SFF storage drive of FIG. 4.

Now turning to FIG. 5, but with reference to FIGS. 6 and 7 as well, at a high level, the carrier 300 includes a main body 302, an interposer board 350, and a lock assembly 400. The main body 302 includes a front 310, a back 314, and an elongate body 320 that extends substantially between the front 310 and back 314 (the front 310 and back 314 may actually be the sides of the main body 302, but are referred to as the front and back because they mate with the shorter sides of the storage drive 200—front 232 and back 234—that are traditionally referred to as the front and back of the storage drive 200, as discussed above). The elongate body 320 is coupled directly to and substantially flush against the front 310. By comparison, there is a gap 316 disposed between the elongate body 320 and the back 314 of the main body 302. Gap 316 provides space for a connector included on the interposer board 350 to extend into a receptacle 330 provided by the main body 302 and connect with the connector 242 included on the back, right edge 240 of the storage drive 200, as is described in further detail below.

The elongate body 320 also includes bottom flanges 328 and a top flange 326 (which can be seen clearly in FIG. 7) and, collectively, a receptacle side or face 320A (see FIG. 7) of the elongate body 320 (also referred to as a first side), the top flange 326 and the bottom flanges 328 define the receptacle 330. The receptacle 330 is configured to receive a storage drive 200 and, thus, is sized so that the right side 214 of the storage drive 200 can be mounted flush against the receptacle side 320A of the elongate body 320 while the top flange 326 engages the top surface 224 of the storage drive 200 and the bottom flanges 328 engages the bottom surface 222 of the storage drive 200. Put simply, the receptacle 330 is sized to mate with a SFF storage drive 200. Meanwhile, the lock assembly 400 is disposed substantially atop the top flange 326 and the interposer board 350 is coupled to an exterior side or face 320B (i.e., a second side) of the elongate body 320 (which is shown in FIG. 6).

At least the elongate body 320 of the main body 302 includes airflow holes 322 that allow air to flow into to the receptacle 330 (or at least into contact with the right face 214 of the storage drive 200) for cooling the storage drive 200 (e.g., air moving in a front-to-back direction through openings 112 included in stanchions 110). By comparison, the left face 212 of the storage drive 200 may be uncovered by the carrier 300 (as is illustrated in FIG. 7) and, thus, the left face 212 may be entirely or nearly entirely exposed to air moving in a front-to-back direction through openings 112 included in stanchions 110. The combination of the improved airflow through the storage area (i.e., due to stanchions 110 and 114 being open and not including backplane components) and improved airflow through the carrier 300 (i.e., due to one face of the storage drive being exposed and the other face being at least partially exposed via airflow openings 322) may improve cooling for the storage drive 200. As is discussed in further detail below, the interposer board 350 may not substantially interfere with this cooling because the interposer board 350 is spaced apart from the main body 302 of the carrier 300 and does not close any airflow openings 322 included on the elongate body 320 of the main body 302.

Still referring to FIGS. 5-7, the front 310 and back 314 of the main body 302 each include guide springs 312. The guide springs 312 are configured to engage the lateral stanchions 110 in the storage area 110 as the carrier 300 is installed into a drive slot 120. This may ensure that the carrier 300 is properly longitudinally aligned within a drive slot 120 during installation (i.e., aligned in the depth direction illustrated by depth D1), which may ensure that the carrier 300 connects with any connectors included on the motherboard 142 that are disposed at the bottom of the drive slot 120 (e.g., edge card connector 144 and pin connectors 146). Moreover, as a carrier 300 is installed in a drive slot 120, the guide springs 312 may discharge electrostatic energy to the stanchions 110, thereby grounding the drive 200 before it is plugged into the motherboard (i.e., hot swapped in). Thus, the guide springs 312 may discourage or prevent the carrier 300 or drive 200 from electrically damaging the motherboard 142. Still further, once a carrier 300 is installed in a drive slot 120, the guide springs 312 substantially secure the carrier 300 against the lateral stanchions 110, which may reduce vibrational chatter. Consequently, the guide springs 312 may discourage the carrier 300 from disconnecting or loosening from the motherboard 142 and/or prevent other deleterious effects of vibrational chatter.

Still referring to FIGS. 5-7, but now with an emphasis on FIG. 6, as mentioned, the interposer board 350 is coupled to the exterior face 320B of the elongate body 320. More specifically, the exterior face 320B of the elongate body 320 includes at least two cylindrical bosses 324 configured to receive couplers 3511 extending through mounting holes 351 on the interposer board 350. Due to the bosses 324 and/or the couplers 3511, the interposer board 350 is spaced, at least slightly from the elongate body 320. As mentioned, this spacing may ensure that airflow passing through the storage area 102 moves into contact with and cools the storage drive 200. Additionally, this spacing may prevent vibrational or shear forces generated by the main body 302 and storage drive 200 (due to the weight of these components) from transferring to the interposer board 350, or at least the spacing may reduce these forces as they transfer to the interposer board 350.

In the particular embodiment depicted in the Figures, the interposer board 350 includes a longitudinal extension 352 and a lateral extension 362 and each section includes a single mounting 351 configured to receive a shoulder screw 3511 that extends through the interposer board 350 and engages with a corresponding cylindrical boss 324 to loosely couple the interposer board 350 to the main body 302 of the carrier 300 (i.e., so that the interposer board 350 floats with respect to the main body 302). However, in other embodiments, the interposer board 350 may be loosely or floatingly mounted to the main body 302 of the carrier 300 in any desirable manner.

As can be seen in FIGS. 5 and 6, the lateral extension 362 extends along a bottom portion of the exterior side 320B of the elongate body 320 (i.e., a portion adjacent flanges 328) and the longitudinal extension 362 extends along a back portion of the elongate body 320 (i.e., a portion adjacent back 314). Consequently, overall, the interposer board 350 substantially resembles backwards L. Notably, this shape leaves a top and center section of the exterior face 320B of the elongate body 320 (of the main body 302) exposed or available, which may increase airflow into the receptacle 330. This shape also provides space for the latch assembly 400 to extend into which, importantly, provides the space necessary for the latch assembly 400 to provide push-push lock and release functionality without extending the carrier 300 beyond the relatively small height space afforded by the high-density storage housing (e.g., a 2U storage blade).

In other embodiments, the interposer board 350 may have any desirable shape; however, the interposer board should extend along at least the gap 316 included at the back edge of the elongate body 320 (i.e., the edge adjacent back 314) and the bottom edge of the elongate body 320 (i.e., the edge adjacent flanges 328) so that the interposer can connect the connector 242 included on the storage drive 200 to the connector 144 included on the motherboard 140. More specifically, since, as mentioned, SFF storage drives 200 typically include a standard connector 242 at their back, bottom edge, the connector 242 is disposed at the back, right edge 240 of the storage drive 200 when the storage drive 200 is in its upright orientation. Consequently, when the storage drive 200 is disposed in the receptacle 330 with its right face 214 against the receptacle face 320A and its back 234 against the back 314 of the main body 302, the connector 242 is aligned with the gap 316. In view of this, the connector 354 included on the longitudinal extension 352 can extend through gap 316 and connect with the connector 242 of the storage drive 200 when the longitudinal extension 352 extends along or over gap 316.

The connector 354 may be configured to mate with the standard connector 242 of the storage drive 200 or, alternatively, interposer logic and/or the connector 354 may be adjusted/reconfigured to receive different types of storage drives. For example, the connector 354 may be configured to provide a Small Computer System Interface (SCSI) connection, Serial Attached SCSI (SAS) connection, an advanced technology attachment (ATA) connection, a Serial ATA (SATA) connection, and/or any other type of connection (including any connections to a non-volatile memory (NVM) storage drive).

Moreover, although not shown, the longitudinal extension 352 may include one or more lights (i.e., light emitting diodes (LEDs)) that provide an indication of a status of the drive. The lights may be disposed at a top edge of the longitudinal extension 352 so that the lights can direct light through light pipes included in the lock assembly 400 (the light pipes are described in connection with FIG. 9 below). Consequently, the interposer board 350 may allow a user to quickly view the status of the storage drives 200 installed in the storage solution 100 when the user has a top view of the storage area 102 (e.g., when the housing 100 is a storage blade and is at least partially removed from its chassis/enclosure, the top cover 150 is removed, and a user is looking down into the storage area 102). Interposer logic can be adjusted based on the type of drive 200 received in receptacle 330 and/or the connection provided to that drive (via connector 354) to ensure the interposer board 350 is providing a proper connection between the drive 200 and the motherboard 142 and to ensure that the lights are responding appropriately.

At the other end of interposer board 350, the lateral extension 362 extends along the bottom edge of the elongate body 320 (i.e., an edge adjacent flanges 328) and, in particular, includes bottom edge 364 spans at least a portion of a major or longer side of the carrier 300 (i.e., a side of the carrier 300 aligned with bottom 222 of the storage drive 200). An edge connector 366 is included on the bottom edge 364. The edge connector 366 is bounded by two guides 368 that are configured to engage guide pin connectors 146 included on the motherboard 142 while guiding edge connector 366 into engagement with the edge card connector 144 disposed between the pin connectors 146 (on motherboard 142). That is, the guides 368 and guide pin connectors 146 are configured to pre-align the edge connector 366 and the edge card connector 144. For example, guides 368 may include bottom openings and the guide pin connectors 146 may slide into the bottom openings as the drive carrier 300 is moved downwards into a drive slot 120. Moreover, once the edge connector 366 and the edge card connector 144 are operatively coupled together, the guides 368 and guide pin connectors 146 may provide additional connections that limit the rotational freedom of the interposer board 350 with respect to the motherboard 142. Consequently, the guides 368 and guide pin connectors 146 may resist or prevent vibrations of the storage drive 200 and/or carrier 300 from harming the connection between edge card fingers 366 of the interposer board 350 and the edge card connectors 144 of the motherboard 142

As a brief summary, the interposer board 350 essentially moves the connection point of a storage drive 200 from its short or minor side to its long or major side. This allows the carrier 300 to be installed into the storage solution 100 in a top-down manner with a single, linearly downward motion, such that its longer side (which enters the drive slot 120 first) serves as a base subsequent to installation. Put another way, the interposer board 350 allows the carrier 300 to be installed directly onto a motherboard 142 disposed atop a bottom 140 of the storage solution 100 in a sideways orientation.

Now referring to FIG. 6 in combination with FIG. 3, overall, the carrier 300 has dimensions configured to mate with the dimensions of a drive slot 120. That is, a drive slot 120 has a height H2, width W2, and depth D2 that are defined by stanchions 110 and 114 and the carrier 300 has a height H4, width W4, and depth D4 that are, at least slightly smaller than the height H2, width W2, and depth D2 of a drive slot 120, respectively. For example, in the depicted embodiment, each drive slot 120 may have a width W2 of approximately 0.9 inches, a depth of approximately 4.55 inches and a height that is nearly 3.5 inches (nearly because the overall storage blade 100 fits into a 2U slot, which has a height of 3.5 inches and, thus, the thickness of slot 120 and the thicknesses of top cover 150 and bottom 140 must provide a collective height that is equal to or less than 3.5 inches). The height H4, width W4, and depth D4 are sized to fit within these dimensions while balancing the ease of removal and installation against vibrational effects and manufacturing tolerancing limits.

Figure 8:
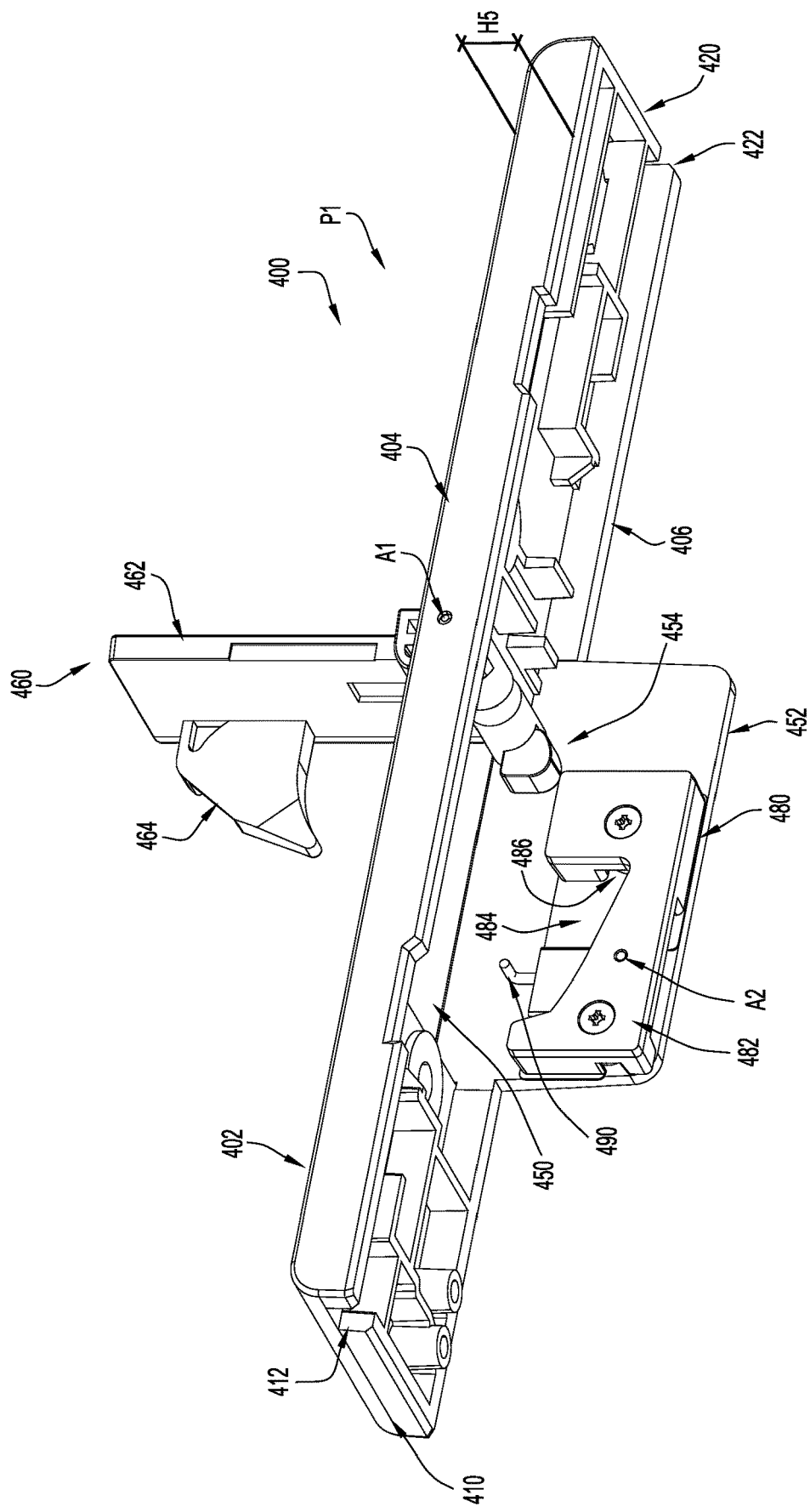
FIG. 8 illustrates a right side perspective view of a lock assembly included in the carrier of FIG. 4.

Now turning to FIG. 8 for a description of the lock assembly 400 included in the carrier 300. As has been alluded to, the lock assembly 400 provides a push-push latch system that allows a user to easily install a carrier 300 into a drive slot 120, lock the carrier 300 into the drive slot 120, and remove the carrier 300 from the drive slot 120. At a high-level, the lock assembly 400 extends across a top major or long side of the carrier 300 (i.e., a side of the carrier extending across top, major side 224 of the storage drive 200) and includes a main body 402, a latch extension 452, and a latch assembly 454. Consequently, the lock assembly 400 may be the only portion of the carrier 300 that is visible when the carrier 300 is installed in a drive slot 120. In view of this, the lock assembly 400 may also include features that provide status indicators for the storage drive 200 stored therein. For example, the main body 400 may include light pipes 414 that are aligned with the interposer board 350 and allow status lights generated by or transferred by the interposer board 350 to be shown through the lock assembly 400.

Dimensionally, the main body 402 of the lock assembly 400 extends from a first side 404 to a second side 406 (spanning the width W4 of the carrier 300) and extends from a first end 410 to a second end 420 (spanning the depth D4 of the carrier 300). Moreover, the main body 402 of the lock assembly 400 has a main body height H5 that ensures that the carrier 300 can fit within a drive slot 120. In the depicted embodiment, the storage solution 100 is a 2U storage blade with a height H1 (see FIG. 1) of approximately 3.5 inches and the storage drive 200 is a 2.5 inch SFF storage drive with a height H3 of approximately 2.75 inches. Consequently, the carrier 300 can only extend a total of approximately 0.75 inches above and below the storage drive 200. In view of this, in the depicted embodiment, the main body 402 of the lock assembly has a height H5 of approximately 0.25 inches. This allows the bottom 140 and top cover 150 to each have a thickness equal to or less than 0.25 inches without preventing the storage blade 100 from fitting into a 2U slot. Due to this height constraint, a substantial portion of the latch assembly 454 is included in or extends into the latch extension 452, which extends downwards from a bottom of the main body 402, into the open area on the exterior side 320B of the elongate body 320 of the main body 302 of the carrier 300 (as is shown and described above in connection with FIGS. 5-7, this area is open because the interposer board 350 is shaped to resemble a backwards L).

Figure 9:
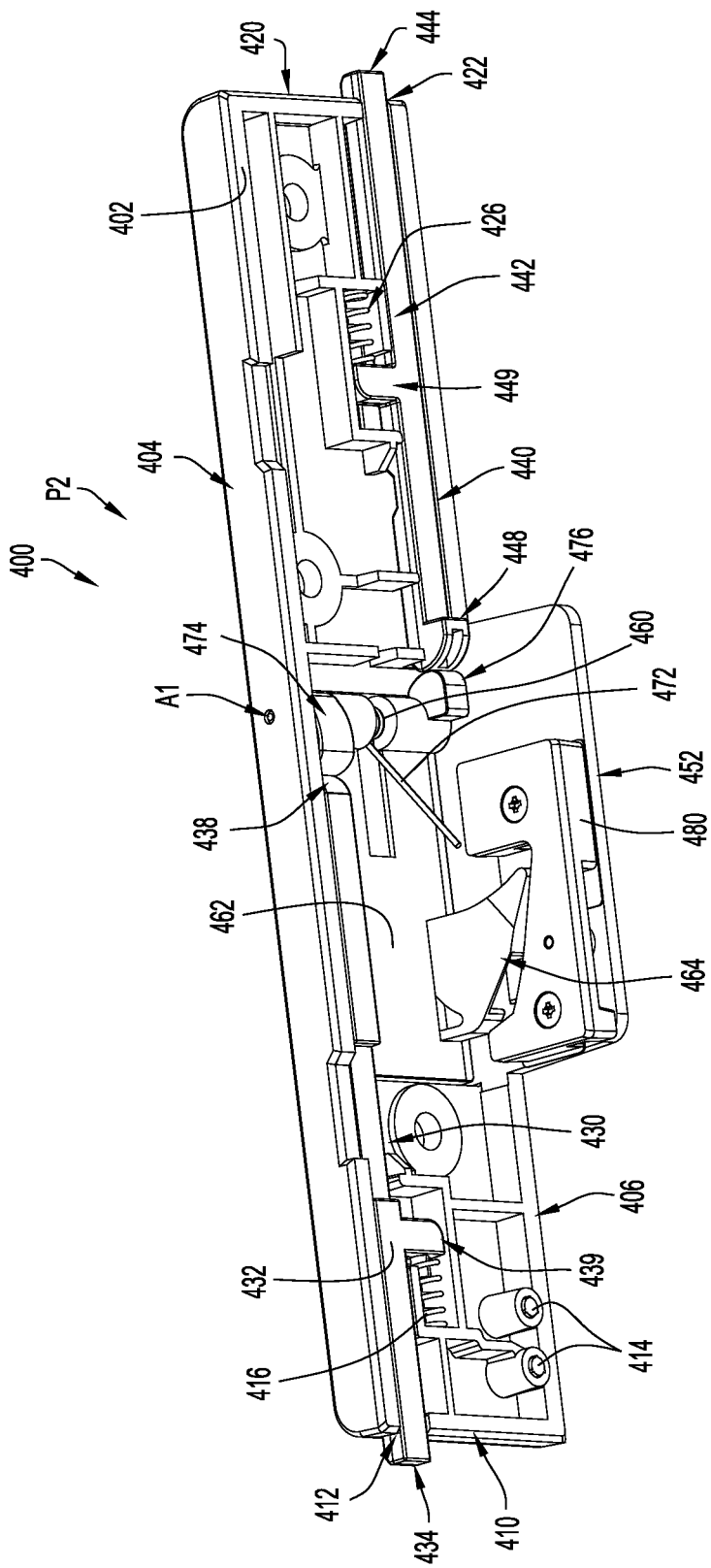
FIG. 9 illustrates a bottom perspective view of the lock assembly of FIG. 8.

Still referring to FIG. 8, but now with reference to FIG. 9 as well, an underside or interior of the main body 402 of the lock assembly 420 defines a first elongate slot 430 and a second elongate slot 440. The first elongate slot 430 extends from the latch assembly 454 to a first opening 412 included at the first end 410 of the main body 402 and houses a slidable pawl 432. Meanwhile, the second elongate slot 440 extends from the latch assembly 454 to a second opening 422 included at the second end 420 of the main body 402 and houses a slidable pawl 442 (the slidable pawls may also be referred to herein simply as pawls). More specifically, pawl 432 includes a distal end 434 that is in communication with opening 412, a proximal end 438 that is in communication with the latch assembly 454, and a lateral extension 439 that is in communication with a resilient member 416. The slot 430 limits the pawl 432 to one degree of freedom: lateral movement along an axis extending between its proximal end 438 and its distal end 434. Similarly, the slidable pawl 442 that includes a distal end 444 that is in communication with opening 422, a proximal end 448 that is in communication with the latch assembly 454, and a lateral extension 449 that is in communication with a resilient member 426. The slot 440 also limits the pawl 442 to one degree of freedom: lateral movement along an axis extending between its proximal end 448 and its distal end 444.

Pawls 432 and 442 may be die cast or formed in any manner that allows pawls 432 and 442 to sit within the elongate slots 430 and 440 and be retained in all directions except their one degree of freedom. However, resilient members 416 and 426 bias pawls 432 and 442, respectively, so that their distal ends 434 and 444 are disposed within the main body 402 (and not extending therefrom). That is, unless actuated, pawls 432 and 442 are in a non-locking or retracted position (a position where the pawls 432 and 442 do not extend out of the main housing 402) and the resilient members 416 and 426 (e.g., return springs 416 and 426) are configured to retain pawls 432 and 442 in this position. During an actuation (i.e., when a latch lever 460 included in the latch assembly 454 is closed), cams 474 and 476 included on the latch lever 460 overcome the biasing force of the resilient members 416 and 426 and drive distal ends 434 and 444 of pawls 432 and 442 out of the main body 402 (as is described in further detail below). Then, when the actuation ends (i.e., when the latch assembly is unlocked), the resilient members 416 and 426, the resilient members 416 and 426 return pawls 432 and 442 back to their non-locking or retracted position.

The main body 402 also defines a latch opening 450. The latch assembly 454 is configured to selectively close the latch opening 450 and the latch extension 452 is aligned with the latch receptacle 450. In particular, the latch assembly 454 includes a latch lever 460 and a latch retainer 480. The latch lever 460 is rotatably coupled to the main body 402 so that the latch lever 460 can selectively close the latch opening 450 (i.e., selectively extend across the latch opening 450). In the depicted embodiment, the latch opening 450 is offset from a center of the main body 402, towards the first 410 end, so that an edge of the latch opening 450 closest to the second end 420 of the main body (the right edge as seen in the depicted drawings) is centered on the main body 402. Consequently, when a user grasps the latch assembly 454 during installation or removal of a carrier 300 (which is described in further detail below), the user will grasp the lock assembly 400 (and, thus, the carrier 300) at a substantially central location (central with respect to its depth D4).

Figure 10A:
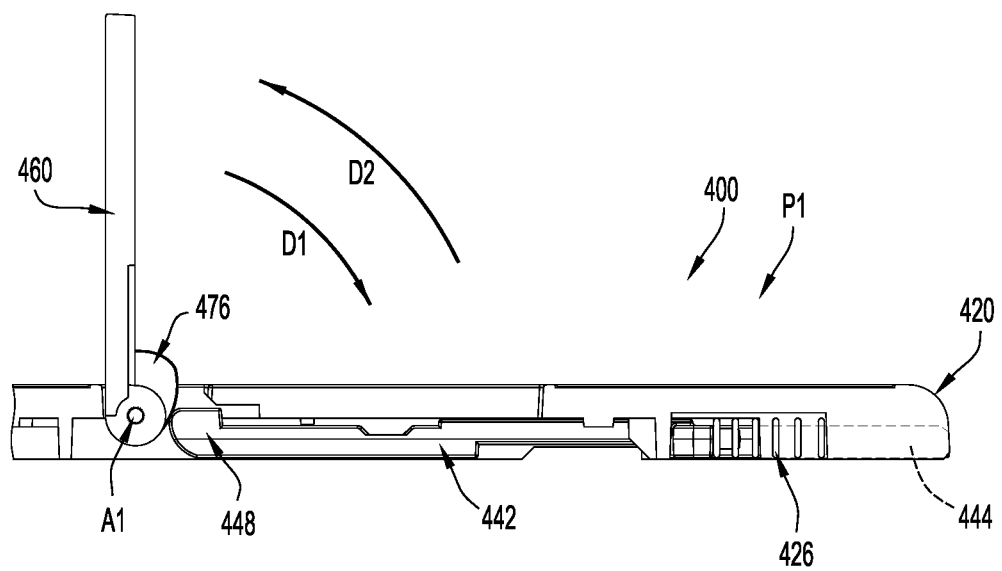
FIGS. 10A and 10B illustrate right side, sectional views of a portion of the lock assembly of FIG. 8, the lock assembly being open in FIG. 10B and closed in FIG. 10B.
Figure 10B:
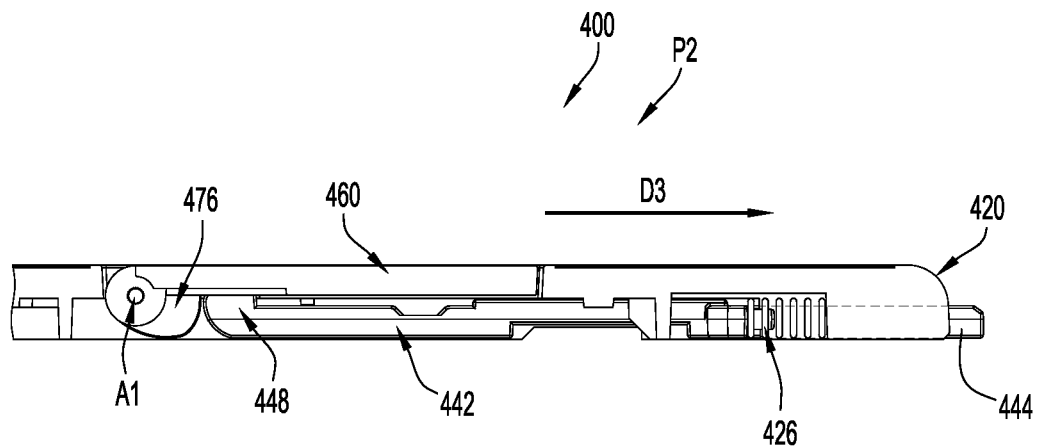

More specifically, the latch lever 460 is mounted on an axle A1 disposed at an edge of the latch opening 450 closest to the second end 420 of the main body (the right edge as seen in the depicted drawings) and the latch lever 460 is rotatable between an open position P1 in which the latch lever 460 is substantially orthogonal to the main body 402 and a closed position P2 in which the latch lever 460 is disposed substantially in-line with the main body 402 (i.e., the latch lever 460 is aligned with or within the main body 402). The latch lever 460 may be mounted to the axle A1 in any desirable manner (i.e., the latch lever may include a cylindrical opening which the axle A1 extends through); however, Turning briefly to FIGS. 10A and 10B, but with continued reference to FIGS. 8 and 9, as mentioned, the latch lever 460 includes two cams mounted on the axle A1: a first cam 474 that is selectively engageable with the first pawl 432 and a second cam 476 that is selectively engageable with the second pawl 442. Although FIGS. 10A and 10B only show pawl 442, it is to be understood that the cams 474 and 476 interact with their respective pawls 432 and 442 in a similar manner and, thus, the illustrations shown in FIGS. 10A and 10B are representative of interactions between cams 474 and 476 and pawls 432 and 442 and the forthcoming description applies to both of cams 474 and 476, as well as both of pawls 432 and 442.

With that being said, when the latch lever 460 is in the open position P1, cam 476 rotates upwards, so that the elongated dimension of cam 476 is out of contact with the pawl 442. Consequently, the biasing force of biasing member 426 retains the pawl 442 substantially within the main body 402. That is, the biasing member 426 prevents or discourages the distal end 444 of pawl 442 from extending out of opening 422. Then, when a user pushes the latch lever 460 downwards in direction D1 to a closed position P2 (i.e., when the latch lever rotates approximately 90 degrees and into alignment with the latch opening 450 defined by the main body 402), the elongated dimension of cam 476 rotates into contact with the proximal end 448 of the pawl 442, forcing the pawl 442 to slide in direction D3 a specific amount (equivalent to the elongated dimension). The cam 476 is sized so that the distal end 444 extends out of (i.e., protrudes from) the opening 422 when the elongated dimension of the cam 476 is engaged with the pawl 442.

As is described in further detail below, the latch lever 460 is configured to be secured or retained (by the latch retainer 480) in its closed position P2 until a user actuates the latch lever 460 (i.e., by pushing on a push plate 462). If the latch lever 460 is actuated while disposed (and secured in) in its closed position P2, the latch retainer 480 will release the latch lever 460, and a rotational biasing member 472 (see FIG. 9) mounted on axle A1 urges the latch lever 460 back in direction D2, towards its open position P1 (which may also be referred to as a disengaged position P1). In fact, the biasing member 472 (see FIG. 9) may urge the latch lever 460 back in direction D2 anytime the latch lever 460 is moved clockwise from its open or disengaged position P1 (i.e., towards position P2). Consequently, the latch lever 460 must be secured in its closed position P2. That is, the latch lever 460 may be spring-loaded (with rotational biasing member 472 acting as the spring) to open to its open position P1, which may be a position that is substantially perpendicular to a top of the main body 402 (i.e., approximately 90 degrees or more from its closed position P2).

Now turning back to FIGS. 8 and 9, the latch lever 460 includes a push plate 462 and a striker 464 while the latch retainer 480 includes a retainer member 482 and a retainer pin 490. The latch retainer 480 is disposed in the latch extension 452 and is generally configured to selectively secure the striker 464 of latch lever 460 to secure the latch lever 460 in a closed position P2 (see FIG. 9). In particular, the retainer member 482 defines a groove 484, a tip receptacle 486, and a retainer pin 490. The retainer pin 490 receives and retains the striker 464 in the groove 484 and/or tip receptacle 486 to retain the latch lever 460 its closed position P2.

Figure 11:
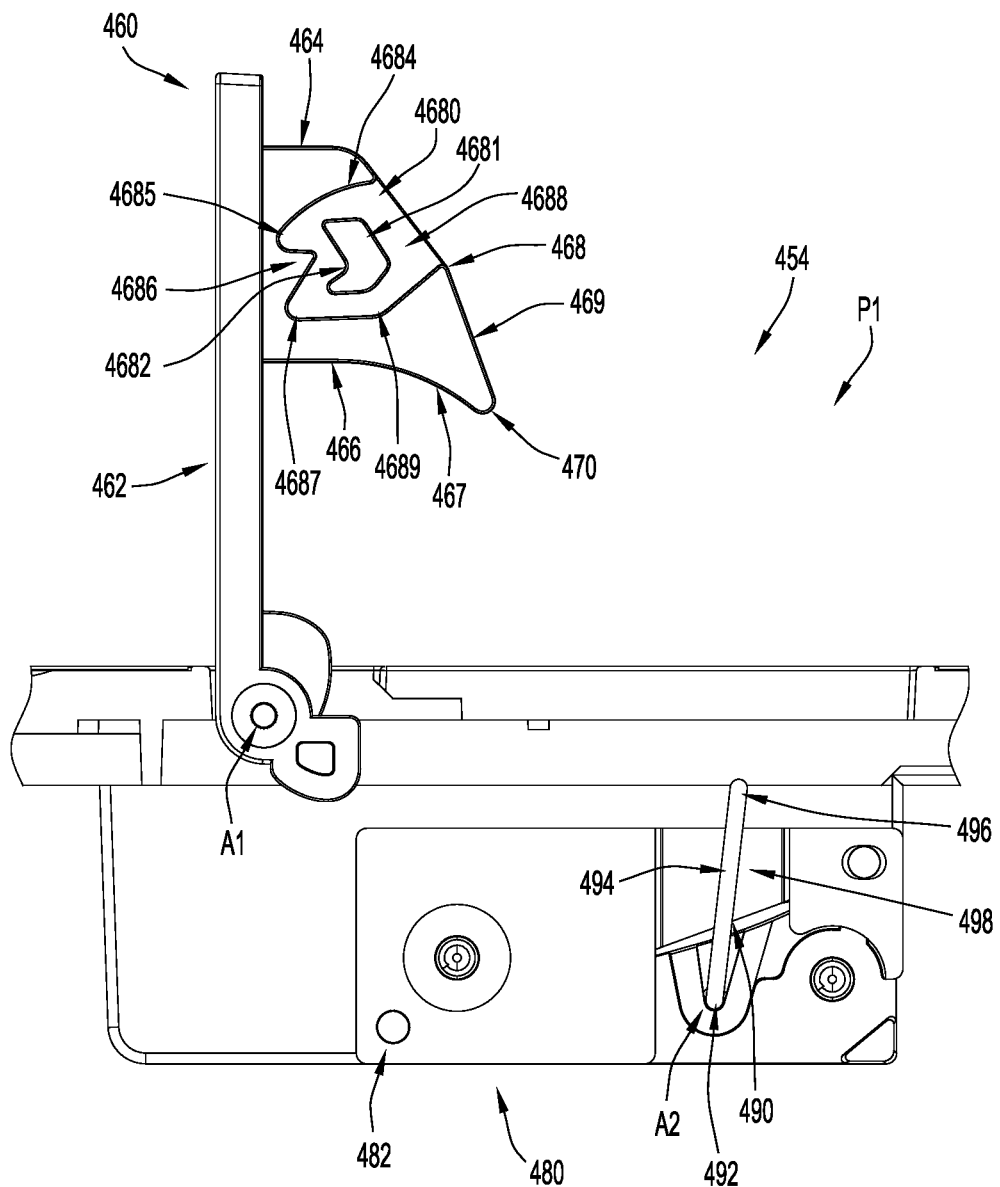
FIG. 11 illustrates a left side, sectional view of a latch assembly included in the lock assembly of FIG. 8.

Now referring to FIG. 11, but with continued reference to FIGS. 8 and 9, for a more detailed description of the interplay of the retainer 480 and latch lever 460. The retainer pin 490 is configured to engage a guide slot 4680 (see FIG. 11) included on the striker 464. FIG. 11 illustrates a side perspective view taken from an opposite side as compared to FIGS. 8 and 9 (i.e., FIG. 11 provides a left side view and FIGS. 8 and 9 provide a right side view). Consequently, FIG. 11 illustrates a majority of the pin 490, which may be separated from the groove 484 by a partition wall. As can be seen, the pin 490 includes a first end 492 that is rotatable on axis A2, a second end 496 that is configured to engage the guide slot 4680 on the striker 464, and an elongate member 494 that extends between the first end 492 and the second end 496. Notably, the elongate member 494 is disposed in a bounded rotational area 498 to limit the rotational movement of the second end 496 with respect to the first end 492 (and with respect to axis A2). This ensures that the guide pin 490 rotates through a restricted angle and remains extending substantially upwards, so that the guide pin 490 can engage a guide slot 4680 included on the striker 464 each time the striker 464 enters the groove 484 included in the latch retainer 480.

Overall, the guide pin resembles a sideways U. That is, the first end 492 and second end 496 may each extend at an approximately right angle from opposite ends of the elongate member 494 (parallel to each other). In the depicted embodiment, the first end 492 and second end 496 extend inwards (i.e., into the page in FIG. 11), towards the groove 484. In at least some embodiments, the guide pin 490 is formed from metal.

The side perspective of FIG. 11 also clearly illustrates the guide slot 4680, which is arranged to align with and receive the guide pin 490 (or, more specifically, the second end 496 of the guide pin 490). Generally, the striker 464 includes a leading edge 466 and an opposite trailing edge 468. The leading edge 466 and trailing edge 468 include tapered portions 467 and 469, respectively, that converge to form a graspable tip 470 and the guide slot 4680 is formed on a portion of the trailing edge 468 that is above or before the tapered portion 469 (i.e., a portion of the trailing edge to the left of the tapered portion 469 in FIG. 11).

The guide slot 4680 includes features that create a push-push lock and release mechanism (i.e., push to lock and push again to unlock) between the latch lever 460 and the latch retainer 480. That is, the guide slot 4680 defines a pathway for the retainer pin 490 that has catches or corners so that the pin 490 selectively secures the latch lever 460 in its closed position P2. In particular, the guide slots 4680 secures the latch lever 460 in a closed position P2 after the latch lever 460 is pushed downwards (i.e., rotated in direction D1) into the latch retainer 480 (e.g., after a first push) and releases the latch lever 460 from the closed position P2 (so that the rotational biasing member 472 (e.g., a kicker spring) urges the latch lever 460 back towards its open position P1) after the latch lever 460 is pushed downwards (i.e., rotated in direction D1) into the latch retainer 480 a second time (e.g., after a second push).

More specifically, the guide slot 4680 includes a floating central protrusion 4681 (which may also be referred to as an island 4681) and an irregular exterior border 4684 that substantially surrounds the central protrusion 4681. Together, the central protrusion 4681 and exterior border 4684 define an open-loop pathway (as opposed to a closed-loop pathway) for the guide pin 490 and, thus, allow the striker 464 to releasably engage the guide pin 490. The pathway includes an entrance 4688 and exit 4689 on the trailing edge 468 of the striker 464. The entrance 4688 and exit 4689 substantially define the open portion of the guide slot 4680. The pathway provided by the guide slot 4680 also includes a number of corners or stops that allow the guide pin 490 to selectively retain the striker 464 in the groove 484 of the retainer member 480 (thereby securing the latch lever 460 in its closed position P1). In particular, the central protrusion 4681 includes a corner 4682 or cradle on a side that is opposite the entrance 4688 and the exterior border 4684 includes a first peak 4685 and second peak 4687 that are separated by a valley 4686. The valley 4686 guides the guide pin to the cradle 4682 of the central protrusion 4681 as the guide pin moves from the first peak 4685 towards the second peak 4687, as is described in further detail below.

Now turning to FIGS. 12A-F, but with continued reference to FIG. 11, for a more detailed depiction of the interplay between the guide pin 490 and the guide slot 4680. Generally, FIGS. 12A-F provide a chronological depiction of the guide pin 490 as it moves through two actuations (i.e., two pushes): a first actuation to lock the latch lever 460 in its closed position P2 and a second actuation to release the latch lever 460 from its closed position P2 (so that rotational biasing member 472 can urge the latch lever 460 towards its open position P1).

Figure 12A:
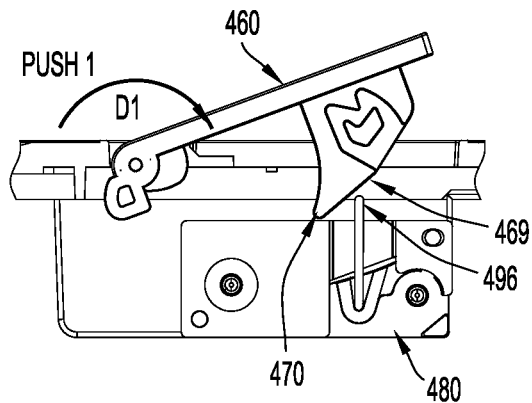
FIGS. 12A-12F illustrate side views of the latch assembly of FIG. 11 as it moves through two actuations, with FIGS. 12A and 12B providing left side views of the latch assembly and FIGS. 12C-12F providing right side views of the latch assembly.
Figure 12D:
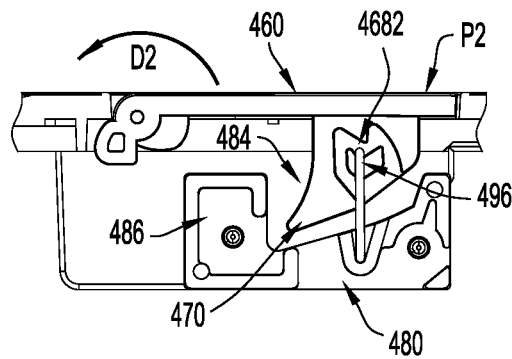
Figure 12B:
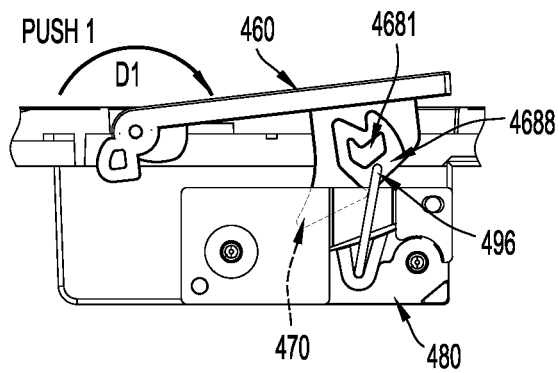

Initially, in FIG. 12A, a first push (e.g., Push 1) on the latch lever 460 (i.e., against the push plate 462, which is labeled, for example, in FIG. 11), rotates the latch lever 460 about axle A1, in direction D1 towards the retainer member 480. As the latch lever 460 rotates in direction D1, the tip 470 and leading edge 466 of the striker 464 enter the groove 484 of the retainer member 480. Then, the second or top end 496 of the guide pin 490 begins to ride along the tapered portion 469 of the trailing edge 468 of the striker 464. As is shown in FIG. 12B, eventually the top end 496 of the guide pin 490 enters the entrance 4688 of the guide slot 4680 (which is an open pathway only defined by a first or bottom side of the central protrusion 4681). As the guide pin 490 moves along the entrance 4688, the tip 470 of the striker 464 moves deeper into the groove 484 of the retainer member 480. As the user keeps pushing the latch lever 460 downwards (e.g., as push 1 continues), the striker continues 464 to rotate in direction D1, moving its tip 470 further into the groove 484, until eventually, the latch assembly prevents the latch lever 460 from rotating any further in direction D1.

As or just before the striker 464 contacts the retainer member 480 (at the bottom of groove 484), the tip moves into the tip receptacle 486 defined at the bottom of the groove 484, which allows the top end 496 of the guide pin 490 to slide to the end of the entrance 4688. That is, the latch assembly 454 allows a user to slightly over-travel the latch lever 460 past a substantially flat position (i.e., +4 degrees) which allows the top end 496 of the guide pin 490 to slide past the first or bottom side of the central protrusion 4681, to a right side of the guide slot 4680. Then, the guide pin 490 can move upwards along the exterior border 4684, into the first peak 4685. When the top end 496 is disposed in the first peak 4685, as is shown in FIG. 12C, the latch lever 460 may be prevented, or at least discouraged, from rotating further in direction D1. Consequently, a user applying the first push (push 1) may intuitively stop actuating (i.e., pushing) the latch lever downwards in direction D1.

When the force of push 1 is released from the latch lever 460 (i.e., after a first actuation), the biasing of the latch lever 460 (from rotational biasing member 472) may cause the latch lever to begin to rotate in direction D2 (i.e., a direction opposite to direction D1). As is shown in FIG. 12D, this reverse rotation moves the top end 496 of the guide pin 490 into engagement with the corner or cradle 4682 of the central protrusion 4681, which prevents any further rotation of the latch lever 460 in direction D2. That is, the cradle 4682 and biasing of the latch lever 460 cooperate to lock the latch lever 460 into its locked position P2. Notably, when the latch lever 460 is secured in its locked position P2, the striker 464 is disposed substantially in the groove 484, but not necessarily engaged therewith. Instead, the latch pin 490 and guide slot 4680 lock the latch lever in its locked position P2 while leaving some room for the striker 464 to rotate in direction D1 in response to a subsequent actuation. That being said, the locked position P2 may be quite secure, even in view of shock and vibration acting on the carrier 300 or the lock assembly 400. Consequently, the latch lever 460 will remain in its locked position P2 until a second actuation (i.e., a second push) is applied to the latch lever.

Figure 12E:
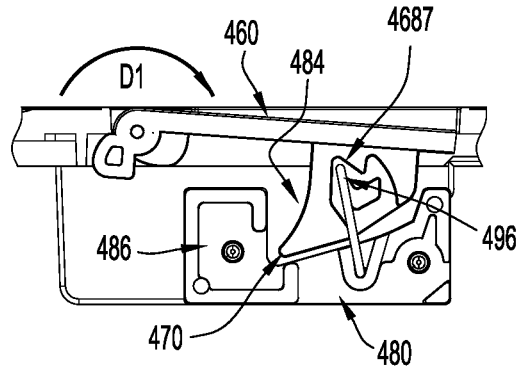
Figure 12C:
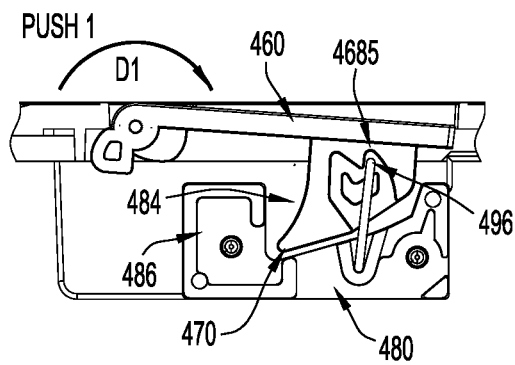
Figure 12F:
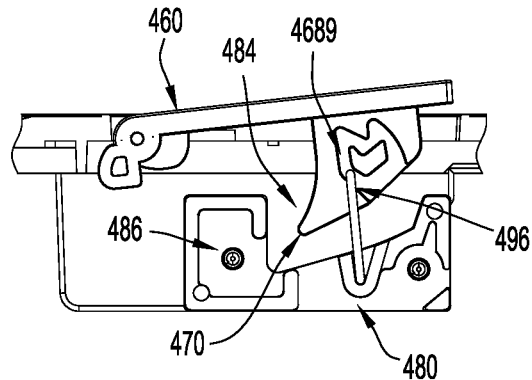

In FIG. 12E, a second push (Push 2) is applied to the push plate 462, which rotates the latch lever downwards, in direction D1, into or along the groove 484 (and possibly into tip receptacle 486). Due to this movement, the top end 496 of the guide pin 490 moves into the second peak 4687. When the top end 496 is disposed in the second peak 4687, the latch lever 460 may be prevented, or at least discouraged, from rotating further in direction D1 (similar to when the top end 496 is disposed in the first peak 4685). Consequently, a user applying the second push (push 1) may stop actuating (i.e., pushing) the latch lever downwards in direction D1 once the top end 496 moves into the second peal 4687.

However, now, when the user releases the latch lever 460, the biasing of the latch lever 460 (from rotational biasing member 472) may cause the latch lever 460 to begin to rotate in direction D2 (i.e., a direction opposite to direction D1) and the guide pin 490 will not stop the rotational movement in direction D2. Instead, the top end 496 will travel along exit 4689 and exit the guide slot 4680, as is shown in FIG.

12F. That is, when the latch lever 460 rotates in direction D2 subsequent to a second actuation, the guide pin 490 will disengage from the latch lever 460 and allow the latch lever 460 to return to its open position P1 (which may be its unbiased or rest position). Put still another way, the guide pin 490 may exit the open-loop pathway included in the striker 464 (and need not stay in continuous contact with the striker 464). However, notably, since the guide pin 490 is disposed in a bounded rotational area 498, the guide pin 490 remains in position for subsequent (i.e., future) locking motions, despite disconnecting from the striker 464 and regardless of an orientation of the carrier 300. That is, a third actuation will cause the striker to begin the motions depicted in FIGS. 12A-D again.

Now referring back to FIG. 4, but in combination with at least FIGS. 8, 9, 10A, 10B, 11, and 12A-12F, in at least one embodiment where the storage solution is a storage blade, when a user is inserting a carrier 300 into a guide slot 120, the storage blade 100 is slid outwards from its chassis/enclosure (e.g., on slide rails) and, if present, a top cover is removed or moved to reveal the storage area 102 to a user looking down on the storage blade 100. Then, the user may retrieve/obtain a carrier 300 to be inserted into the storage blade 100. If the latch lever 460 is its closed position P2, the user actuates (i.e., push on) the latch lever 460 to position the latch lever 460 in its open position P1. When the latch lever 460 is in position P1, the push plate 462 will extend vertically above the carrier 300 and the striker 464 will extend laterally therefrom to provide an easily accessible grip for a user. In fact, the tip 470 and the tapered section 467 of the leading edge 466 may form a grip that curls around a user's finger, so that the latch lever 460 is very easy to grasp. Consequently, a user may easily grasp the carrier 300 via the latch lever 460 and lower the carrier 300 into a drive slot 120 with a single, linearly downward motion.

As has been mentioned repeatedly herein, the lock assembly 400 is included on a top major or long edge of the carrier 300 so that a bottom long or major edge of the carrier 300 enters the drive slot 120 first and engages the motherboard 142 disposed at the bottom of the drive slot 120. The interposer board 350 allows the carrier 300 to couple a storage drive 200 disposed within the carrier 300 directly to the motherboard 142 during this installation. Once the carrier 300 is disposed in the drive slot 120 (i.e., once the storage drive 200 is connected to the motherboard 142), the user can push the latch lever 460 downwards into engagement with the latch retainer 480, as was shown and described in connection with FIGS. 12A-12D, to secure the latch lever in its closed position P2. This actuation may further ensure that the carriage 300 is fully connected to the motherboard 142.

As the latch lever 460 is secured in its closed position P2, the latch lever 460 actuates pawls 432 and 442 included in the main body 402 of the lock assembly 400, as was described in connection with FIGS. 8, 9, 10A, and 10B. Consequently, pawls 432 and 442 extend outwards from the main body 402, into the apertures 113 included on the lateral stanchions 110 to lock the carrier 300 into the drive slot 120. That is, pawls 432 and 442 will retain the carrier 300 (and, thus, the drive 200) in a drive slot 120 with sufficient tolerance to avoid any disengagement or discontinuities between the storage drive 200 and the motherboard 142 (via the interposer board 350) during any shock and/or vibration events. If necessary (e.g., if the storage solution 100 is a storage blade), the user can then slide the storage blade 100 back into its 2U slot (e.g., on its slide rails) to secure the storage blade 100 in the chassis/enclosure. Sliding the storage blade 100 back into the chassis/enclosure may allow a back 128 of the storage blade 100 to engage or reconnect with any electrical connections included in the chassis/enclosure if these connections were disconnected when the storage blade 100 was slid out of its slot.

When a user wants to remove the carrier 300 from the drive slot (i.e., to hot swap a new storage drive into the drive slot 120), if necessary (e.g., if the storage solution 100 is a storage blade), the user repeats the steps discussed above for removing the storage blade 100 from its chassis/enclosure. Regardless, then the user actuates the push plate 462 of the latch lever 460 again (i.e., re-actuates the latch lever 460). This second actuation (e.g., a second push) releases the latch lever 460 from its position P2 and allows the latch lever 460 to move back towards its open position P1, as was shown and described in connection with FIGS. 12E and 12F. As the latch lever 460 moves towards its open position P1 (due to biasing provided by rotational biasing member 472), pawls 432 and 442 are urged back into the main housing 402 of the lock assembly 400 by return springs 416 and 426, respectively. Once pawls 432 and 442 disengage from the apertures, the user can grasp the striker 464 and pull the carrier 300 upwards out of the drive slot 120.

There are several advantages to the storage blade and carrier presented herein. Most notably, the storage blade presented herein provides a storage area within which storage drives can be installed (while in carriers) in a sideways orientation with a single, linear motion (a downward motion when the storage blade is oriented as shown in the example embodiment depicted in the Figures). The sideways orientation provides a very high density within a large surface area of a relatively short storage solution. That is, the storage solution presented herein provides a very high capacity in a storage solution with a short exterior height because any storage drives stored therein are stored in an area spanning a majority of a depth and a width of the storage solution. Notably, the depth and width are typically the two largest dimensions of a storage solution, while the height is typically the shortest side of a storage solution.

Moreover, despite providing a high density, the storage solution presented herein ensures that each storage drive is easily accessible. That is, each storage drive (and its carrier) is not hidden or obscured after installation of multiple drives (i.e., the storage drives are not stacked atop each other) and can be viewed and grasped from a position above the storage solution (again, with reference to the storage solution orientation shown in the example embodiment depicted in the Figures). Consequently, storage drives can be quickly and easily hot swapped/plugged into and out of the storage solution. For example, when the storage drive carrier presented herein is configured for a 2.5 inch SFF storage drive, the storage solution may offer hot swappable/pluggable storage for up to fifty-six 2.5 inch SFF storage drives within a 2U form factor (e.g., a storage blade that fits within a 2U slot of a blade chassis/enclosure). The storage solution and storage drive carrier presented herein also ensure that each storage drive is provided with sufficient airflow for cooling, at least because the carriers connect directly into a motherboard included along a bottom of the storage area (and, thus, allow the stanchions to include a plethora of openings).

Still further, the carrier presented herein enables storage drives to be installed into a storage solution in a sideways orientation with a single, linear motion. This installation is facilitated by transferring or moving a storage drive's connection point to its major or long side (as opposed to a short side). Consequently, the storage area need not include extra parts or wiring to accommodate the carriers, such as rotatable or slidable drive drawers, mini-backplanes, etc. Instead, the carriers presented herein plug directly into a motherboard disposed along the bottom of the storage area. This minimizes costs associated with manufacturing a storage solution. The carrier presented herein is also advantageous because a majority of the carrier structure extends along the faces of the storage drive. Due to this, the carrier only slightly expands the dimensions of the storage drive in the depth direction (i.e., in the direction of depth D1 from FIGS. 1 and 2). Often, storage solutions are strictly constrained in the depth direction, so this feature maximizes the capacity of the storage area of a storage solution. That is, the depth of the carrier maximizes the number of storage banks that can be included in a storage area of a storage solution (with the storage banks extending across the width of the storage area).

By comparison, in front-loading, back-loading, or side-loading storage solutions, the storage area spans a much smaller surface area of the solution (height by width or height by depth instead of depth by width), so even the densest front/back/side-loading storage solutions will not offer as much storage drive capacity as a storage solution of the same exterior size that is configured in accordance with the concepts presented herein. For example, front-loading (or back-loading or side-loading) 2U storage blades can often only receive a maximum of twenty-four 2.5 inch SFF storage drives while maintaining proper cooling airflow, granularity of hot-pluggable individual drives, and the highest speed interface. In the example shown and described above in connection with FIG. 1, the storage solution provides a 2U storage blade with a storage area for fifty-six 2.5 inch SFF storage drives while providing ample cooling airflow and maintaining granularity of hot-pluggable individual drives and the highest speed interface. In some instances, front-loading storage solutions attempt to expand the overall area by including removable and/or rotatable drive drawers; however, drive drawers increase the costs and materials needed to manufacture a storage solution and also take up valuable space that can be used to store additional storage drives.

As another alternative, storage solutions might provide a backplane-style system for storage drives to plug into, sliding front-to-rear, to allow multiple banks of drives front-to-back, but such a system creates interconnect issues from drive to motherboard, air flow impediments, and uses valuable space to allow for sliding and the compound drive installation. The drives may also be difficult to access in such a setup (i.e., multiple drives may need to be removed from the solution before a particular storage drive can be accessed for removal or inspection). On the other hand, top-loading storage solutions often insert a short end of a storage drive into the solution first, which requires the storage solution to have a larger external height (and, thus, for example, a storage blade for 2.5 inch SFF storage drives could not fit in a 2U slot). Alternatively, a top-loading storage solution may include mini backplanes extending between drive slots, which may limit capacity and density, while also increasing costs associated with manufacturing the solution. Moreover, as compared to the storage solution presented herein, it may be more difficult to install a storage drive into a top-loading storage solutions with vertical mini backplanes, since the storage drives must be dropped down and then slid laterally within a drive slot. The mini backplanes also create cooling disadvantages as compared to the storage solution presented herein, as is explained above.

Still further, the storage solution and storage drive carrier presented herein provide further advantages because the carrier includes a push-push latch/locking system. Due to this system, the user can easily grasp a latch to lower the carrier into a slot and close the same latch to lock the drive in place; the user is not required to actuate multiple actuators or grasp multiple components during installation or removal. For example, the user need not grasp a handle to slide the drive in, close a separate latch, and then press a separate button (or complete some other order of operations involving multiple components). The push-push latch system facilitates this single component, single actuation installation by providing a latch lever that can fully detach from a latch retainer (since a latch pin included in the latch retainer selectively engages an open-loop pathway included in a striker of the latch lever). The push-push latch system is also intuitive to operate and relatively inexpensive to manufacture.

To summarize, in one form, a system is provided comprising: a housing including: a storage area that extends across at least a portion of a width and at least a portion of a depth of the housing; and a motherboard that extends across the storage area and that includes a plurality of first connectors; and a plurality of drive carriers that each include a second connector configured to mate directly with one of the plurality of first connectors, the second connector of each drive carrier of the plurality of drive carriers being disposed on a long edge of its drive carrier so that the plurality of drive carriers mount storage drives to the housing in a sideways orientation.

In still another form, an apparatus is provided comprising: a main body sized to receive a storage drive, the storage drive including a main body with opposing minor edges and opposing major edges that each extend between opposing faces, and a connector extending along an edge between a first face of the opposing faces and a first minor edge of the opposing minor edges; an interposer board that extends along a portion of the first face of the storage drive, the interposer board including: a first connector configured to mate with the storage drive connector; and a second connector disposed along a first major edge of the opposing major edges and configured to connect the storage drive to a motherboard extending along a bottom surface of a storage housing while the storage drive sits on the first major edge.

In another form, a storage apparatus is provided comprising: a housing including a bottom that is bounded by a front, a back, and two sides; a motherboard that is disposed atop the bottom and is parallel to the bottom; and a plurality of drive slots that are each sized to receive a drive carrier in a position that aligns a long edge of the drive carrier with the motherboard.

In yet another form, a system is provided comprising: a blade chassis including a number of slots; and a blade housing configured to fit into a two rack unit slot of the chassis, the blade housing providing at least forty-eight slots for 2.5 inch small form factor storage drives.

In still another form, a method is provided comprising: inserting a storage drive into a receptacle of a drive carrier; grasping a latch lever of a latch lever included on a first long side of the drive carrier and inserting the drive carrier into a drive slot while grasping the latch lever; and actuating the latch lever to lock the drive carrier into the drive slot. In some embodiments of this method, the inserting comprising lowering the drive carrier into the drive slot with a single, linear motion, the single linear motion connecting the drive carrier to a motherboard disposed at a bottom of the drive slot. Moreover, in some embodiments of this method, the actuating comprises rotating the latch lever into a closed position.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims. For example, as mentioned, the concepts described herein may be utilized for storage solutions, including but not limited to storage blades, that accommodate storage drives other than 2.5 inch SFF drives and/or storage solutions that fit into chassis/enclosure slots other than 2U slots.

What is claimed is:

1. A system comprising:
a housing including:
a storage area that extends across at least a portion of a width and at least a portion of a depth of the housing; and
a motherboard that extends across the storage area and that includes a plurality of first connectors; and
a plurality of drive carriers that each include a main body sized to receive a respective storage drive and an interposer board having a second connector configured to mate directly with one of the plurality of first connectors, the second connector of each drive carrier of the plurality of drive carriers being disposed on a long side of its drive carrier so that the plurality of drive carriers mount storage drives to the housing in a sideways orientation,
wherein each of the plurality of drive carriers further comprises a third connector configured to mate with a storage drive connector disposed on the respective storage drive from among the storage drives, and
wherein the main body is disposed between the interposer board and the respective storage drive.

2. The system of claim 1, wherein the long side of each drive carrier provides a base for the sideways orientation.

3. The system of claim 1, wherein the plurality of drive carriers are each configured to receive a 2.5 inch small form factor (SFF) storage drive and the housing further comprises:
exterior dimensions configured to fit within a two rack unit (2U) of a chassis.

4. The system of claim 1, wherein the housing further comprises:
lateral stanchions that span a width of the storage area; and
longitudinal stanchions that span a depth of the storage area.

5. The system of claim 4, wherein the lateral stanchions define a plurality of banks in the storage area and the longitudinal stanchions divide each of the plurality of banks into a plurality of drive slots that are each aligned with one of the plurality of first connectors.

6. The system of claim 1, wherein each drive carrier of the plurality of drive carriers further comprises:
a lock assembly configured to lock its drive carrier into the housing while its second connector is connected to one of the plurality of first connectors.

7. The system of claim 6, wherein each lock assembly further comprises:
a pair of pawls configured to engage apertures included in stanchions disposed on either side of its drive carrier.

8. The system of claim 1, wherein a single, linear motion installs each drive carrier of the plurality of drive carriers into the housing and connects each drive carrier of the plurality of drive carriers with the motherboard.

9. A drive carrier apparatus comprising:
a main body sized to receive a storage drive, the storage drive including: (1) another main body with opposing short sides and opposing long sides that each extend between opposing faces, and (2) a storage drive connector disposed on the storage drive and extending along an edge between a first face of the opposing faces and a first short side of the opposing short sides; and
an interposer board that extends along a portion of the first face of the storage drive and has the main body being disposed between the interposer board and the storage drive, the interposer board includes:
a first connector configured to mate with the storage drive connector; and
a second connector disposed along a first long side of the opposing long sides and configured to connect the storage drive to a motherboard extending along a bottom surface of a storage housing while the storage drive sits on the first long side.

10. The drive carrier apparatus of claim 9 further comprising:
a lock assembly configured to lock the drive carrier apparatus to the storage housing while the second connector is connected to the motherboard.

11. The drive carrier apparatus of claim 10, wherein the lock assembly further comprises:
a latch assembly that is actuatable between an open position and a closed position; and
a pair of pawls that extend exteriorly away from the opposing short sides to lock the drive carrier apparatus to the storage housing when the latch assembly is in the closed position.

12. The drive carrier apparatus of claim 11, wherein the latch assembly comprises:
a latch retainer with a guide pin; and
a latch lever with a striker, the guide pin being positioned to selectively engage an open-loop pathway in the striker to selectively retain the latch assembly in the closed position.

13. The drive carrier apparatus of claim 12, wherein the latch lever provides a grip when the latch assembly is in the open position, the grip being usable by a user to insert the drive carrier apparatus into the storage housing.

14. The drive carrier apparatus of claim 9, wherein the main body comprises:
lateral guide springs that align the main body within a drive slot of the storage housing both before and after the second connector connects to the motherboard.

15. The drive carrier apparatus of claim 9, wherein the main body extends over a second face of the opposing faces.

16. The drive carrier apparatus of claim 12, wherein the guide pin is disposed in a bounded rotational area to limit a range of rotational movement of the guide pin.

17. The drive carrier apparatus of claim 9, wherein:
the first connector is disposed on the interposer board,
the interposer board comprises a substantially backwards L-shape that leaves at least a top section of the main body or a center section of the main body exposed, and
the interposer board is coupled to an exterior face of the main body of the drive carrier apparatus.

18. The drive carrier apparatus of claim 9, further comprising:
a lock assembly configured to lock the drive carrier apparatus to the storage housing while the second connector is connected to the motherboard, wherein the lock assembly is disposed on the main body and extends across the first long side on a top surface of the storage housing, wherein the interposer board leaves a gap at a top section of the main body or a center section of the main body, and at least a portion of the lock assembly fits into the gap.

19. The drive carrier apparatus of claim 18, wherein the lock assembly includes:
   a latch body that spans a width of the drive carrier apparatus;
   a latch extension that is configured to selectively close a latch opening defined by the latch body; and
   a latch assembly that is actuatable between an open position and a closed position and includes a latch lever and a latch retainer, wherein the latch retainer is configured to engage a guide slot disposed on a striker of the latch lever, creating a push-push lock and release mechanism.

20. A drive carrier apparatus comprising:
   a first main body sized to receive a storage drive, the storage drive including: (1) a second main body with opposing short sides and opposing long sides that each extend between opposing faces, and (2) a storage drive connector disposed on the storage drive and extending along an edge between a first face of the opposing faces and a first short side of the opposing short sides;
   an interposer board that extends along a portion of the first face of the storage drive, the interposer board including:
      a first connector configured to mate with the storage drive connector, and
      a second connector disposed along a first long side of the opposing long sides and configured to connect the storage drive to a motherboard extending along a bottom surface of a storage housing of the storage drive while the storage drive sits on the first long side; and
   a lock assembly configured to lock the drive carrier apparatus to the storage housing while the second connector is connected to the motherboard, wherein the lock assembly is disposed on the first main body and extends across the first long side on a top surface of the storage housing.

21. The drive carrier apparatus of claim 20, wherein the interposer board leaves a gap at a top section of the first main body or a center section of the first main body, and at least a portion of the lock assembly fits into the gap.

22. The drive carrier apparatus of claim 20, wherein the interposer board is coupled to an exterior face of the first main body.

23. The drive carrier apparatus of claim 20, wherein the lock assembly comprises:
   a latch assembly that is actuatable between an open position and a closed position; and
   a pair of pawls that extend exteriorly away from the opposing short sides to lock the drive carrier apparatus to the storage housing when the latch assembly is in the closed position.

* * * * *